United States Patent
Shimamura et al.

(10) Patent No.: US 9,611,903 B2
(45) Date of Patent: Apr. 4, 2017

(54) PULLEY STRUCTURE

(71) Applicant: MITSUBOSHI BELTING LTD., Kobe-shi, Hyogo (JP)

(72) Inventors: Hayato Shimamura, Hyogo (JP); Ryosuke Dan, Hyogo (JP); Makoto Haraguchi, Hyogo (JP); Katsuya Imai, Hyogo (JP)

(73) Assignee: MITSUBOSHI BELTING LTD., Hyogo (JP)

( * ) Notice: Subject to any disclaimer, the term of this patent is extended or adjusted under 35 U.S.C. 154(b) by 182 days.

(21) Appl. No.: 14/409,346

(22) PCT Filed: Jun. 20, 2013

(86) PCT No.: PCT/JP2013/066939
§ 371 (c)(1),
(2) Date: Dec. 18, 2014

(87) PCT Pub. No.: WO2013/191240
PCT Pub. Date: Dec. 27, 2013

(65) Prior Publication Data
US 2015/0184703 A1 Jul. 2, 2015

(30) Foreign Application Priority Data

Jun. 20, 2012 (JP) .................................. 2012-138978
Nov. 16, 2012 (JP) .................................. 2012-252550
Jun. 14, 2013 (JP) .................................. 2013-125839

(51) Int. Cl.
*F16H 55/36* (2006.01)
*F16F 15/123* (2006.01)
(Continued)

(52) U.S. Cl.
CPC ............. *F16D 41/206* (2013.01); *F16D 3/74* (2013.01); *F16D 13/08* (2013.01); *F16D 41/20* (2013.01);
(Continued)

(58) Field of Classification Search
CPC ...... F16H 55/36; F16H 2055/366; F16D 3/12; F16D 7/022; F16D 13/76; F16D 41/20;
(Continued)

(56) References Cited

U.S. PATENT DOCUMENTS 2,595,454 A 5/1952 Greenlee
2007/0123380 A1 5/2007 Ishida et al.
(Continued)

FOREIGN PATENT DOCUMENTS

EP 0 678 685 10/1995
EP 2 258 968 12/2010
(Continued)

OTHER PUBLICATIONS

Office Action issued in corresponding Chinese Patent Application No. 201380032657.X, Jun. 30, 2016, 15 pages with translation.
(Continued)

*Primary Examiner* — Richard Lorence
(74) *Attorney, Agent, or Firm* — Hamre, Schumann, Mueller & Larson, P.C.

(57) ABSTRACT

The present invention relates to a pulley structure containing a first rotatable body, a second rotatable body and a torsional coil spring, in which the torsional coil spring has one end region, the outer circumferential surface of which is in contact with one rotatable body due to the self elastic restoring force when the pulley structure is in a stopped state, the other end region, the inner circumferential surface of which is in contact with the other rotatable body when the pulley structure is in the stopped state, and a middle region,
(Continued)

and in which when the torsional coil spring is twisted in the diameter increasing direction, the inner circumferential surface of at least a circumferential portion of the other end region of the torsional coil spring separates from the other rotatable body.

14 Claims, 16 Drawing Sheets

(51) Int. Cl.
*F16D 41/20* (2006.01)
*F16D 3/74* (2006.01)
*F16D 13/08* (2006.01)
*F16F 15/129* (2006.01)

(52) U.S. Cl.
CPC .......... *F16F 15/123* (2013.01); *F16F 15/129* (2013.01); *F16H 55/36* (2013.01); *F16H 2055/366* (2013.01)

(58) Field of Classification Search
CPC . F16D 41/206; F16D 2300/22; F16F 15/1216
See application file for complete search history.

(56) References Cited

U.S. PATENT DOCUMENTS

2007/0240964 A1* 10/2007 Saito et al. ........... F16D 41/206
192/41 S
2009/0197719 A1 8/2009 Ali et al.
2011/0015018 A1 1/2011 Yamatani et al.
2011/0245000 A1* 10/2011 Serkh et al. ........ F16F 15/1216
474/94

FOREIGN PATENT DOCUMENTS

| | | |
|---|---|---|
| JP | 36-019622 Y | 7/1961 |
| JP | 3-229019 | 10/1991 |
| JP | 7-293575 | 11/1995 |
| JP | 2008-019959 | 1/2008 |
| JP | 2008-057763 | 3/2008 |
| JP | 2008-175347 | 7/2008 |
| JP | 2011-511228 | 4/2011 |
| JP | 2012-112480 | 6/2012 |
| WO | 2009/099505 | 8/2009 |

OTHER PUBLICATIONS

Notification of Reasons for Refusal issued in corresponding Japanese Patent Application No. 2013-125839, Jul. 7, 2015, 9 pages with an English translation.
Extended European Search Report issued in corresponding European Application No. 13807425.7, Mar. 15, 2016, 7 pages.

* cited by examiner

FORWARD ← → REARWARD

PULLEY STRUCTURE

TECHNICAL FIELD

The present invention relates to a pulley structure with a coil spring.

BACKGROUND ART

In an auxiliary unit drive system that drives, by the power of an engine for a vehicle, an auxiliary unit such as an alternator, a belt is stretched over a pulley connected to a drive shaft of the auxiliary unit such as the alternator and a pulley connected to a crankshaft of the engine, and torque of the engine is transmitted to the auxiliary unit via the belt. Typically, the rotating speed of the crankshaft of the engine changes due to a power stroke of the engine or the like, and the travelling speed of the belt also changes. For this reason, a slip may occur between the pulley connected to the drive shaft of the auxiliary unit and the belt, or the tension of the belt may change considerably. The slip of the belt or an excessive change in the tension of the belt is one of causes of the occurrence of an abnormal sound or lifetime depression of the belt.

In particular, since a power generating shaft of the alternator has a large moment of inertia, a slip of the belt or a change in the tension of the belt is likely to occur. There are problems in that the transmission of a change of rotation of the crankshaft to the power generating shaft decreases the durability of the alternator and adversely affects a power generating efficiency.

In the related art, various proposals for a pulley are made so as to absorb a change in the rotation of the crankshaft. For example, a pulley structure disclosed in Patent Document 1 contains a first rotatable body over which a belt is stretched; a second rotatable body that is provided inward of the first rotatable body and can rotate relative to the first rotatable body; and a coil spring that is disposed between the two rotatable bodies. Outer circumferential surfaces (or inner circumferential surfaces) of opposite end portions of the coil spring are in press contact with the first and second rotatable bodies, respectively due to a self restoring force in a diameter increasing direction (or diameter decreasing direction).

When a change in the rotation of the crankshaft is transmitted to the first rotatable body via the belt and the two rotatable bodies rotate relative to each other, torque is transmitted between the two rotatable bodies via the coil spring interposed therebetween, the coil spring is twisted in a circumferential direction, so that the change of rotation is absorbed. For this reason, it is possible to prevent the occurrence of a slip of the belt or a change in tension.

PRIOR ART DOCUMENTS

Patent Document

Patent Document 1: JP-A-2008-57763

SUMMARY OF INVENTION

Problems that the Invention is to Solve

However, in the pulley structure disclosed in Patent Document 1, there is a problem in that since a torsional torque increases further as the torsional angle of the coil spring increases in the diameter increasing direction, the coil spring is easily subjected to fatigue under usage conditions in which a torsional angle becomes relatively large.

In the related art, in order to cope with this problem, the number of turns of the coil spring is increased to decrease a spring constant, whereby a load exerted on the coil spring is reduced. When the spring constant is decreased, a torsional torque decreases even at the same torsional angle, so that it is possible to improve the fatigue resistance of the coil spring. However, there is a problem in that since an increase in the number of turns of the coil spring increases the axial length of the coil spring, the size of the pulley structure increases.

An object of the present invention is to provide a pulley structure that can improve the fatigue resistance of a coil spring without causing an increase in the size of the pulley structure.

Means for Solving the Problems

The pulley structure according to a first aspect of the present invention contains:

a first rotatable body having a cylindrical shape, over which a belt is stretched;

a second rotatable body that is provided inward of the first rotatable body so as to be rotatable relative to the first rotatable body; and a torsional coil spring that is accommodated in a space between the first rotatable body and the second rotatable body, in which the torsional coil spring has one end region at one end side thereof, the outer circumferential surface of which is in contact with one rotatable body of the first rotatable body and the second rotatable body due to the self elastic restoring force of the torsional coil spring in a diameter increasing direction when the pulley structure is in a stopped state; the other end region at the other end side thereof, the inner circumferential surface of which is in contact with the other rotatable body when the pulley structure is in the stopped state; and a middle region, and in which when the torsional coil spring is twisted in the diameter increasing direction due to a relative rotation between the two rotatable bodies, the inner circumferential surface of at least a circumferential portion of the other end region of the torsional coil spring separates from the other rotatable body.

With this configuration, when the pulley structure is in the stopped state, the torsional coil spring is fixed to the two rotatable bodies by the structure that the outer circumferential surface at one end thereof is pushed against one rotatable body due to the self elastic restoring force in the diameter increasing direction and an inner circumferential surface of the other end region is in contact with the other rotatable body.

When the two rotatable bodies rotate relative to each other, the torsional coil spring is twisted to thereby absorb a change of rotation.

When the torsional coil spring is twisted in the diameter increasing direction, due to a deformation of the torsional coil spring in the diameter increasing direction, at least a circumferential portion of the inner circumferential surface of the other end region of the torsional coil spring separates from the other rotatable body. Therefore, the number of active turns of the torsional coil spring increases compared to when the pulley structure is in the stopped state. The number of active turns of a torsional coil spring is the number of turns for a range obtained by excluding a portion for the fixation of the spring from the entire length of the spring, and a spring constant decreases further as the number of active turns increases. Accordingly, since in the pulley structure of the aspect, a relative rotation between the two rotatable bodies can increase the number of active turns of the torsional coil spring to decrease the spring constant, it is possible to improve the fatigue resistance of the torsional coil spring without increasing the number of turns of the coil spring (without increasing the size of the pulley structure) compared to a conventional pulley structure in which an inner circumferential surface or an outer circumferential surface of each of opposite end portions of a coil spring is fixed to rotatable bodies even when rotating relative to each other.

In the present invention, the term "when the pulley structure is in a stopped state" means a state in which an external force is not applied to the pulley structure (a state where the torsional angle of the torsional coil spring is zero).

The pulley structure according to a second aspect of the present invention is that, in the first aspect, the other rotatable body has a contact surface that faces an end surface of the other end side of the torsional coil spring in a circumferential direction, and when the torsional coil spring is twisted in the diameter increasing direction due to a relative rotation between the two rotatable bodies, the end surface of the other end side of the torsional coil spring is brought into contact with the contact surface.

With this configuration, when the torsional coil spring is twisted in the diameter increasing direction, the end surface of the other end side of the torsional coil spring is brought into contact with the contact surface of the other rotatable body, so that the torsional coil spring is fixed to the other rotatable body.

The pulley structure according to a third aspect of the present invention, in the second aspect, further contains:

a first gap that is formed between the outer circumferential surface of the other end region of the torsional coil spring and the first rotatable body or the second rotatable body, when the pulley structure is in the stopped state, in which when the torsional coil spring is twisted in the diameter increasing direction due to a relative rotation between the two rotatable bodies, the outer circumferential surface of the other end region of the torsional coil spring is not in contact with any one of the two rotatable bodies when the end surface of the other end side of the torsional coil spring is in contact with the contact surface.

With this configuration, since the gap is present between the outer circumferential surface of the other end region of the torsional coil spring and the rotatable body when the pulley structure is in the stopped state, when the torsional coil spring is twisted in the diameter increasing direction, the other end region of the torsional coil spring is easily deformed in the diameter increasing direction to separate the inner circumferential surface of the other end region from the other rotatable body.

When the end surface of the other end side of the torsional coil spring is in contact with the contact surface, the outer circumferential surface of the other end region of the torsional coil spring is not in contact with any of the two rotatable bodies. Therefore, it is possible to fix the other end region of the torsional coil spring to the contact surface alone, and to increase the number of active turns.

The pulley structure according to a fourth aspect of the present invention, in the third aspect, further contains:

a second gap that is formed between an outer circumferential surface of the middle region of the torsional coil spring and the first rotatable body or the second rotatable body, when the pulley structure is in the stopped state.

With this configuration, since the gap is present between the outer circumferential surface of the middle region of the torsional coil spring and the rotatable body when the pulley structure is in the stopped state, when the torsional coil spring is twisted in the diameter increasing direction, it is possible to easily deform the torsional coil spring in the diameter increasing direction. When the torsional angle in the diameter increasing direction increases and the outer circumferential surface of the middle region of the torsional coil spring is brought into contact with the rotatable body, it is possible to limit a further deformation in the diameter increasing direction than that point and to prevent damage of the torsional coil spring.

The pulley structure according to a fifth aspect of the present invention is that, in the fourth aspect, the size of the first gap is less than or equal to the size of the second gap.

With this configuration, if the torsional angle of the torsional coil spring in the diameter increasing direction increases and the outer circumferential surface of the other end region of the torsional coil spring brought into contact with the rotatable body, almost at the same time or when the torsional angle increases further than that, the outer circumferential surface of the middle region of the torsional coil spring is brought into contact with the rotatable body, so that it is possible to limit a further deformation in the diameter increasing direction than this point and to prevent damage of the torsional coil spring. Since the outer circumferential surface of the torsional coil spring is brought into contact with the rotatable bodies, the number of active turns of the torsional coil spring changes. Accordingly, it is possible to make the pulley structure having three or more spring constants.

The pulley structure according to a sixth aspect of the present invention, in the second aspect, further contains a limiting means for limiting a deformation of the other end region of the torsional coil spring in the diameter increasing direction before the end surface of the other end side of the torsional coil spring is in contact with the contact surface when the torsional coil spring is twisted in the diameter increasing direction due to a relative rotation between the two rotatable bodies.

In a case in which the limiting means is not provided, when the torsional coil spring is twisted in the diameter increasing direction, torsional stress applied to each turn is not constant, torsional stress is concentrated on a turn of the other end side of the torsional coil spring, and this turn is most greatly deformed in the diameter increasing direction. However, in this aspect, since a deformation of the other end region of the torsional coil spring in the diameter increasing direction can be limited by the limiting means, it is possible to prevent torsional stress from being concentrated on the other end region and to reduce a difference in torsional stress applied to each turn of the torsional coil spring. As a result, it is possible to prevent a fatigue failure of the torsional coil spring.

The pulley structure according to a seventh aspect of the present invention is that, in the sixth aspect, the other rotatable body has the limiting means.

The pulley structure according to an eighth aspect of the present invention is that, in the seventh aspect, the limiting means is at least one supporting protrusion that protrudes inwards in a radial direction and that faces an outer circumferential surface of a circumferential portion of the other end region of the torsional coil spring, in which when the torsional coil spring is twisted in the diameter increasing direction due to a relative rotation between the two rotatable bodies, at least the one supporting protrusion is in contact with the outer circumferential surface of the other end region of the torsional coil spring and a deformation of the other end region of the torsional coil spring in the diameter increasing direction is limited.

With this configuration, when the torsional coil spring is twisted in the diameter increasing direction, the supporting protrusion is brought into contact with the outer circumferential surface of the circumferential portion of the other end region of the torsional coil spring. Therefore, it is possible to prevent torsional stress from being concentrated on the other end region and to separate the inner circumferential surface of the circumferential portion of the other end region of the torsional coil spring from the other rotatable body. That is, the supporting protrusion is not an obstacle to increasing the number of active turns of the torsional coil spring.

The pulley structure according to a ninth aspect of the present invention is that, in the eighth aspect, a region in which the supporting protrusion is formed contains a position distant from the contact surface by 90° about a rotation axis.

In a case in which the limiting means is not provided, when the torsional coil spring is twisted in the diameter increasing direction, the torsional stress is most greatly concentrated in the vicinity of the position distant from the end surface of the other end side of the torsional coil spring by 90° about the rotation axis. In this aspect, since the supporting protrusion is disposed to contain the position distant from the contact surface by 90° about the rotation axis, it is possible to prevent torsional stress from being concentrated in the vicinity of the position distant from the end surface of the other end side of the torsional coil spring by 90° about the rotation axis.

The pulley structure according to a tenth aspect of the present invention is that, in the ninth aspect, an angle about the rotation axis formed by the contact surface and a farther end portion of the region in which the supporting protrusion is formed from the contact surface is less than or equal to 315°.

When the angle about the rotation axis, which is formed by the farther end portion of the supporting protrusion from the contact surface and the contact surface, is excessively large, a contact area between the other end region of the torsional coil spring and the supporting protrusion increases and the other end region of the torsional coil spring becomes difficult to slide against the supporting protrusion. For this reason, the torsional angle at the time when the other end region of the torsional coil spring slides against the supporting protrusion and the end surface of the other end side of the torsional coil spring is brought into contact with the contact surface increases, so that the torsional coil spring is easily subjected to fatigue in a torsional range of up to this torsional angle.

In this aspect, since the angle about the rotation axis, which is formed by the contact surface and the farther end portion of the supporting protrusion from the contact surface, is set to 315° or less, it is possible to prevent the torsional angle at the time when the other end region of the torsional coil spring slides against the supporting protrusion from increasing excessively.

The pulley structure according to an eleventh aspect of the present invention, in any one of the eighth to tenth aspect, further contains a fourth gap that is formed between the outer circumferential surface of the other end region of the torsional coil spring and a portion other than the supporting protrusion of the other rotatable body when the pulley structure is in the stopped state, wherein the outer circumferential surface of the other end region of the torsional coil spring is in contact with the supporting protrusion, or the pulley structure further comprises a third gap that is formed between the outer circumferential surface of the other end region of the torsional coil spring and the supporting protrusion and is smaller than the fourth gap.

With this configuration, since the gap (the fourth gap) is present between the outer circumferential surface of the other end region of the torsional coil spring and the portions other than the supporting protrusion of the other rotatable body when the pulley structure is in the stopped state, when the torsional coil spring is twisted in the diameter increasing direction, the other end region of the torsional coil spring can be deformed in the diameter increasing direction to separate the inner circumferential surface of the other end region from the other rotatable body.

The pulley structure according to a twelfth aspect of the present invention is that, in the sixth aspect, the torsional coil spring has the limiting means.

The pulley structure according to a thirteenth aspect of the present invention is that, in the twelfth aspect, the limiting means is at least one supporting protrusion that protrudes outwards in the radial direction and that is present on the outer circumferential surface of a circumferential portion of the other end region of the torsional coil spring, and in which when the torsional coil spring is twisted in the diameter increasing direction due to a relative rotation between the two rotatable bodies, at least the one supporting protrusion is in contact with an inner circumferential surface of the other rotatable body and a deformation of the other end region of the torsional coil spring in the diameter increasing direction is limited.

With this configuration, when the torsional coil spring is twisted in the diameter increasing direction, the supporting protrusion provided in the other end region of the torsional coil spring is brought into contact with the inner circumferential surface of the other rotatable body. Therefore, it is possible to prevent torsional stress from being concentrated on the other end region, and to separate the inner circumferential surface of a circumferential portion of the other end region of the torsional coil spring from the other rotatable body. That is, the supporting protrusion is not an obstacle to increasing the number of active turns of the torsional coil spring.

The pulley structure according to a fourteenth aspect of the present invention, in any one of the sixth to thirteenth aspect, further contains a second gap that is formed between the outer circumferential surface of the middle region of the torsional coil spring and the first rotatable body or the second rotatable body when the pulley structure is in the stopped state. With this configuration, the same effects as the fourth aspect are obtained.

MODE FOR CARRYING OUT THE INVENTION

First Embodiment

Hereafter, a pulley structure 1 of a first embodiment of the present invention will be described.

The pulley structure 1 of this embodiment is installed on a drive shaft of an alternator in an auxiliary unit drive system (not illustrated) of a vehicle. The auxiliary unit drive system has a configuration in which a belt is stretched over a drive pulley connected to a crankshaft of an engine and a driven pulley that drives an auxiliary unit such as an alternator. The rotation of the crankshaft is transmitted to the driven pulley via the belt, so that the auxiliary unit such as an alternator is driven. The rotating speed of the crankshaft changes due to a combustion event of the engine, and the speed of the belt also changes in association with this change.

Figure 1:
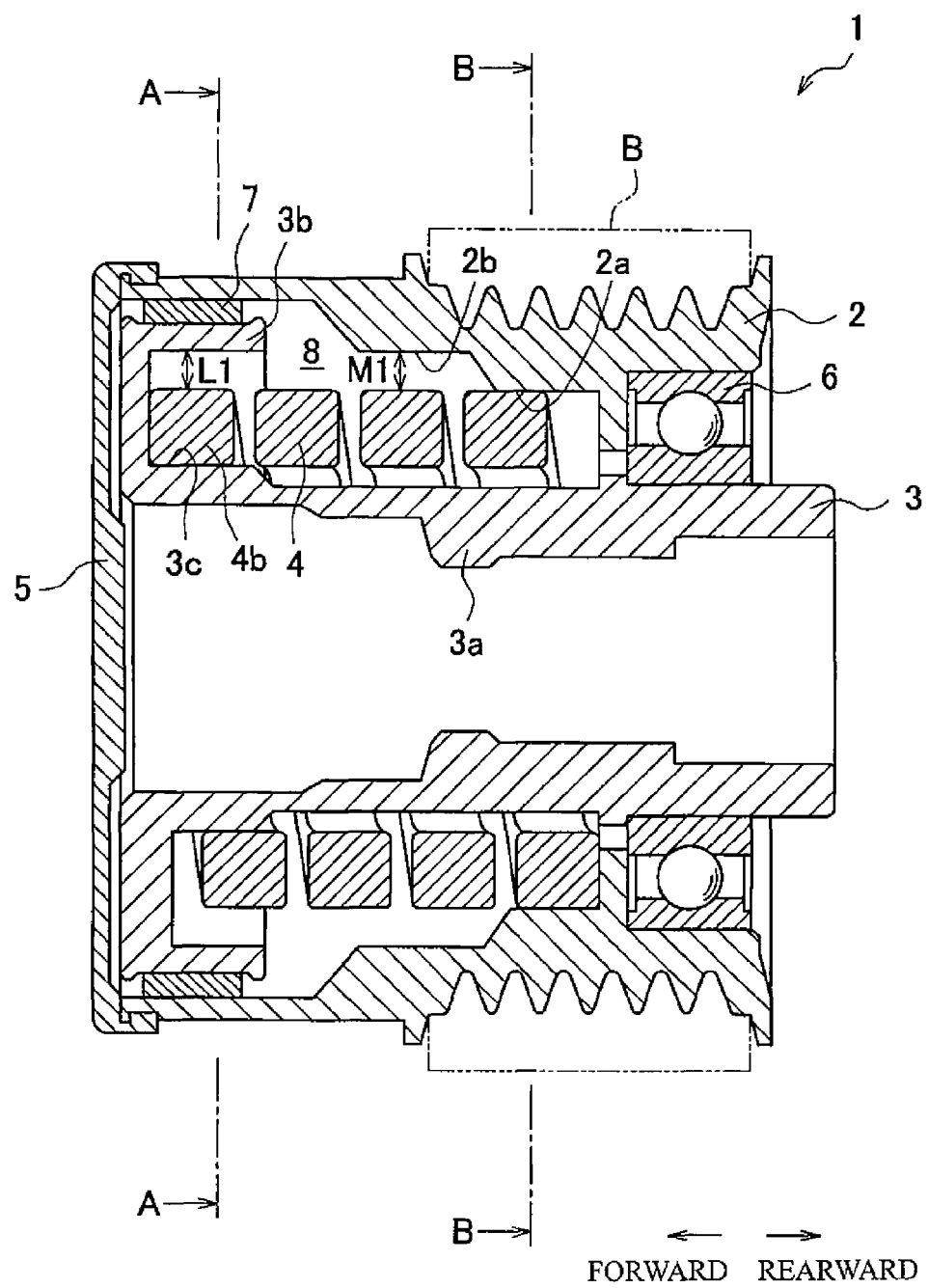
FIG. 1 is a cross-sectional view of a pulley structure of the first embodiment of the present invention.
Figure 2:
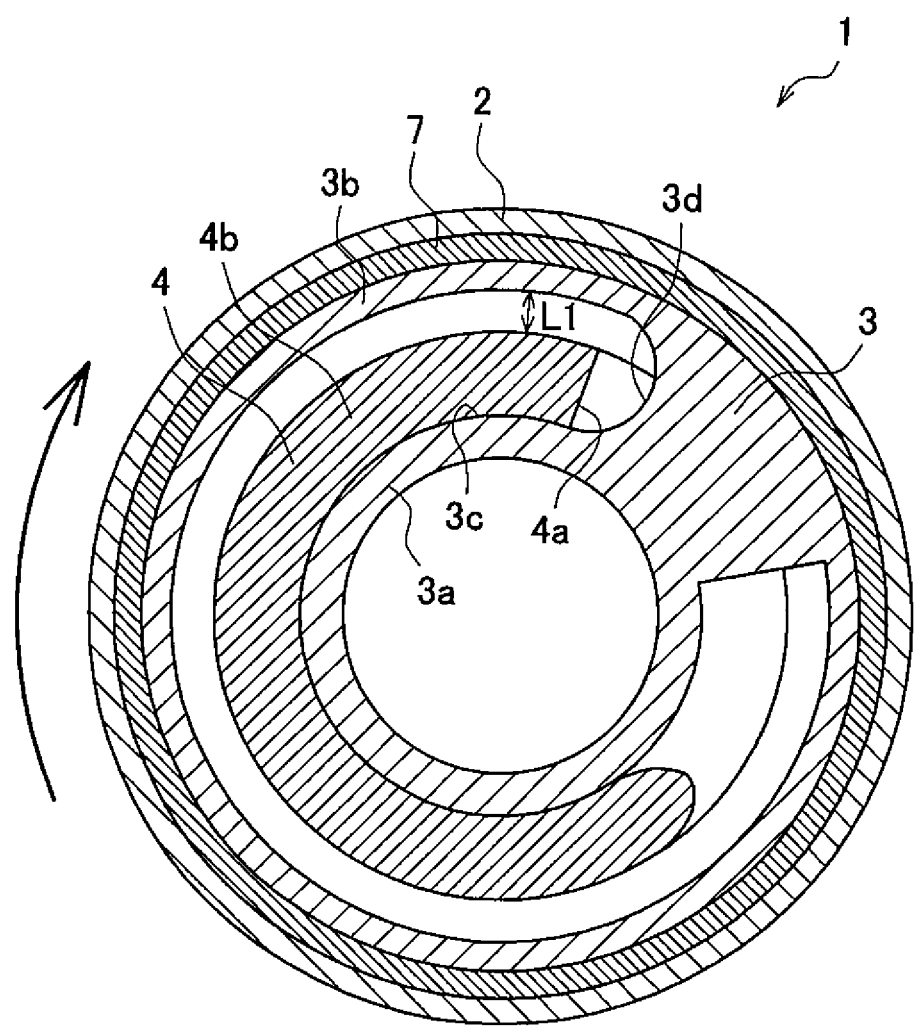
FIG. 2 is a cross-sectional view taken along line A-A in FIG. 1.
Figure 3:
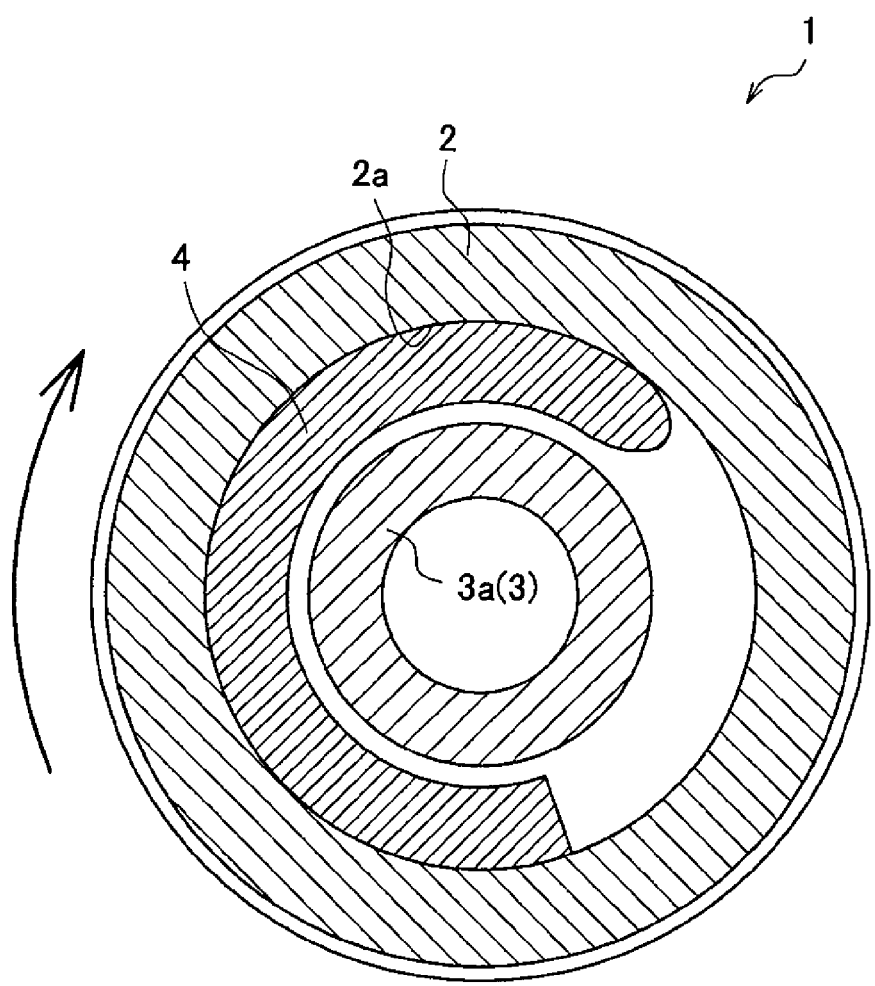
FIG. 3 is a cross-sectional view taken along line B-B in FIG. 1.

As illustrated in FIG. 1 to FIG. 3, the pulley structure 1 of this embodiment includes a first rotatable body 2 having a substantially cylindrical shape, over which a belt B is stretched; a second rotatable body 3 having a substantially cylindrical shape and disposed inward of the first rotatable body 2 with the same rotation axis; a torsional coil spring 4 that is accommodated in a spring accommodating space 8 between the first rotatable body 2 and the second rotatable body 3; and an end cap 5 that is disposed at an axial end of each of the first rotatable body 2 and the second rotatable body 3. In the following description, a left direction and a right direction on the sheet of FIG. 1 are referred to as a forward direction and a rearward direction, respectively. The same is also applied to second to seventh embodiments which will be described later.

The second rotatable body 3 has a cylinder main body 3a that is fixed to an outer circumference of a drive shaft (not illustrated) of the alternator in a fitting manner, and an outer cylinder portion 3b that is disposed outward of a front end portion of the cylinder main body 3a.

A roller bearing 6 is provided between an inner circumferential surface of a rear end portion of the first rotatable body 2 and an outer circumferential surface of the cylinder main body 3a of the second rotatable body 3. A slide bearing 7 is provided between an inner circumferential surface of a front end portion of the first rotatable body 2 and an outer circumferential surface of the outer cylinder portion 3b of the second rotatable body 3. The first rotatable body 2 and the second rotatable body 3 are connected to each other via the two bearings 6 and 7 in a state of being rotatable relative to each other. The first rotatable body 2 and the second rotatable body 3 rotate in a direction of the arrow in FIG. 2 and FIG. 3.

The spring accommodating space 8 is formed between the first rotatable body 2 and the second rotatable body 3, and forward of the roller bearing 6. The spring accommodating space 8 accommodates the torsional coil spring 4. The spring accommodating space 8 is a space that is formed between the inner circumferential surface of the first rotatable body 2 and an inner circumferential surface of the outer cylinder portion 3b of the second rotatable body 3, and an outer circumferential surface of the cylinder main body 3a of the second rotatable body 3.

The inner diameter of the first rotatable body 2 in the spring accommodating space 8 decreases in two stages in the rearward direction. An inner circumferential surface of a portion having the smallest inner diameter is referred to as a press contact surface 2a, and an inner circumferential surface of a portion having the second smallest inner diameter is referred to as an annular surface 2b. The diameter of the press contact surface 2a is less than the inner diameter of the outer cylinder portion 3b of the second rotatable body 3. The diameter of the annular surface 2b is equal to or greater than the inner diameter of the outer cylinder portion 3b of the second rotatable body 3.

The cylinder main body 3a of the second rotatable body 3 has an outer diameter which is larger at the front end portion than that of other portions in the spring accommodating space 8. The outer circumferential surface of this portion is referred to as a contact surface 3c.

The torsional coil spring 4 is left-handed (wound in a counterclockwise direction toward the tip of the axial direction), and the diameter thereof without an external force applied thereto is constant over the entire length thereof. The torsional coil spring 4 has a rear end region (one end region); a middle region; and a front end region (other end region) 4b. The outer diameter of the torsional coil spring 4 without an external force applied thereto is larger than the inner diameter of the press contact surface 2a of the first rotatable body 2. The torsional coil spring 4 is accommodated in the spring accommodating space 8 with the diameter of a rear end thereof reduced, and an outer circumferential surface of the rear end region (one end region) of the torsional coil spring 4 is pushed against the press contact surface 2a of the first rotatable body 2 due to the self elastic restoring force of the torsional coil spring 4 in a diameter increasing direction.

In a state where the pulley structure 1 is in the stopped state and the outer circumferential surface of the rear end region (one end region) of the torsional coil spring 4 is pushed against the press contact surface 2a due to the self elastic restoring force, the front end region (the other end region) 4b of the torsional coil spring 4 is in contact with the contact surface 3c of the second rotatable body 3 with the diameter thereof slightly increased. That is, when the pulley structure 1 is in the stopped state, an inner circumferential surface of the front end region (other end region) 4b of the torsional coil spring 4 is pushed against the contact surface 3c of the second rotatable body 3. The front end region (other end region) 4b is a region that extends halfway or more (greater than or equal to 180° about the rotation axis) from a front tip (other end) of the torsional coil spring 4.

In a state where the inner circumferential surface of the front end region (other end region) 4b of the torsional coil spring 4 is in contact with the contact surface 3c, a gap (first gap) L1 is formed between an outer circumferential surface of the front end region (other end region) 4b of the torsional coil spring 4 and the inner circumferential surface of the outer cylinder portion 3b of the second rotatable body 3.

A gap (second gap) M1 is formed between the annular surface 2b of the first rotatable body 2 and an outer circumferential surface of the middle region of the torsional coil spring 4. In a state where the inner circumferential surface of the front end region (other end region) 4b of the torsional coil spring 4 is in contact with the contact surface 3c, the gap M1 is equal to or greater than the gap L1 that is formed between the inner circumferential surface of the outer cylinder portion 3b of the second rotatable body 3 and the outer circumferential surface of the front end region (other end region) 4b of the torsional coil spring 4 (L1≤M1).

As illustrated in FIG. 2, a contact surface 3d is formed in the front end portion of the second rotatable body 3, which faces a front end surface 4a of the torsional coil spring 4 in a circumferential direction. The contact surface 3d has a circular arc shape when seen in an axial direction.

Subsequently, the operation of the pulley structure 1 will be described.

First, a case will be described in which the rotating speed of the first rotatable body 2 is higher than the rotation speed of the second rotatable body 3, that is, the first rotatable body 2 is accelerated. In this case, the first rotatable body 2 rotates relative to the second rotatable body 3 in the same direction as the rotation direction (direction of the arrow in FIG. 2 and FIG. 3).

In association with the relative rotation of the first rotatable body 2, the rear end region of the torsional coil spring 4 together with the press contact surface 2a of the first rotatable body 2 rotates relative to the second rotatable body 3. Accordingly, the torsional coil spring 4 is twisted in the diameter increasing direction.

The press contact force of the rear end region of the torsional coil spring 4 against the press contact surface 2a increases further as the torsional angle of the torsional coil spring 4 increases.

When the torsional angle of the torsional coil spring 4 in the diameter increasing direction is less than a predetermined angle θ1 (for example, 5°), the press contact force of the front end region (other end region) 4b of the torsional coil spring 4 against the contact surface 3c decreases slightly compared to when the torsional angle is zero, but the front end region (other end region) 4b of the torsional coil spring 4 is in press contact with the contact surface 3c.

When the torsional angle of the torsional coil spring 4 in the diameter increasing direction is θ1, the press contact force of the front end region (other end region) 4b of the torsional coil spring 4 against the contact surface 3c becomes almost zero, the front end region (other end region) 4b of the torsional coil spring 4 slides against the contact surface 3c in the circumferential direction, and the front end surface 4a of the torsion coil spring 4 is pressed against the contact surface 3d of the second rotatable body 3 in the circumferential direction. Since the front end surface 4a is pressed against the contact surface 3d, torque can be reliably transmitted between the two rotatable bodies 2 and 3.

When the torsional angle of the torsional coil spring 4 in the diameter increasing direction exceeds θ1, the inner circumferential surface of at least a circumferential portion of the front end region (other end region) 4b of the torsional coil spring 4 separates from the contact surface 3c due to a deformation of the torsional coil spring 4 in the diameter increasing direction. Since the contact surface 3d has a circular arc shape, when the front end surface 4a of the torsional coil spring 4 is pressed against the contact surface 3d in the circumferential direction, the front end surface 4a moves outwards in a radial direction along the contact surface 3d, so that the inner circumferential surface of the front end region 4b separates easily from the contact surface 3c.

Figure 4:
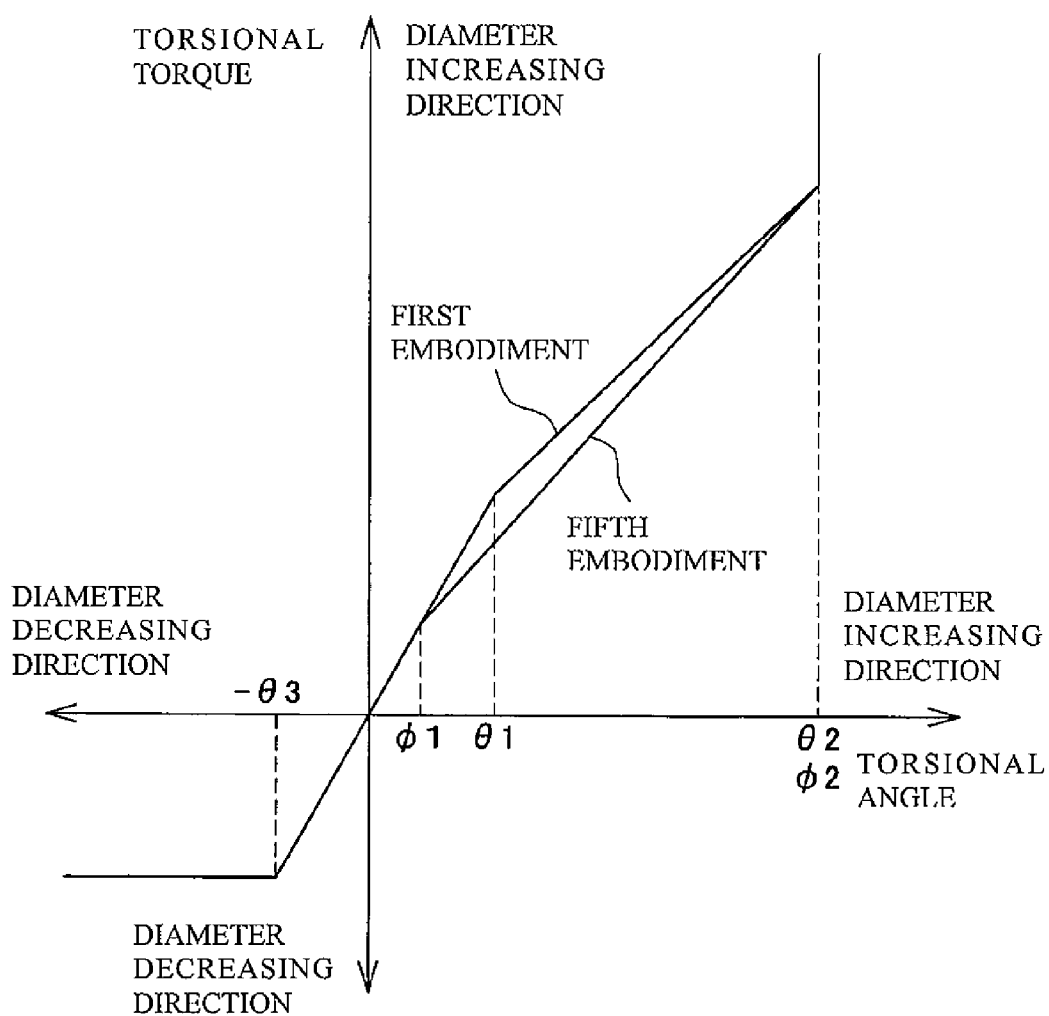
FIG. 4 is a graph illustrating a relationship between the torsional angle and the torsional torque of a torsional coil spring of the pulley structure of the first and fifth embodiments.

When the torsional angle of the torsional coil spring 4 in the diameter increasing direction is greater than or equal to θ1 (less than angle θ2), the torsional coil spring 4 is fixed to the second rotatable body 3 by only the front end surface 4a, so that the number of active turns of the torsional coil spring 4 increases compared to when the torsional angle is less than θ1. The number of active turns of a coil spring is the number of turns for a range obtained by excluding a portion for the fixation of the spring from the entire length of the spring, and it is inversely proportional to a spring constant (torsional torque/torsional angle). Here, FIG. 4 is a graph illustrating a relationship between the torsional angle and the torsional torque of the torsional coil spring 4. When the torsional angle in the diameter increasing direction is greater than or equal to the angle θ1, as illustrated in FIG. 4, the spring constant (the slope of the straight line illustrated in FIG. 4) decreases as the number of active turns increases.

When the torsional angle of the torsional coil spring 4 in the diameter increasing direction becomes a predetermined angle θ2 (for example, 45°), the outer circumferential surface of the front end region (other end region) 4b of the torsional coil spring 4 is brought into contact with the inner circumferential surface of the outer cylinder portion 3b of the second rotatable body 3. Almost at the same time or when the torsional angle increases further than that, the outer circumferential surface of the middle region of the torsional coil spring 4 is brought into contact with the annular surface 2b of the first rotatable body 2 or the torsional angle reaches a limit angle, so that a further deformation of torsional coil spring 4 in the diameter increasing direction is limited and the first rotatable body 2 rotates integrally with the second rotatable body 3. Accordingly, damage of the torsional coil spring due to a deformation in the diameter increasing direction can be prevented. The size of each of the gaps L1 and M1 in the state where the pulley structure is in the stopped state is set, taking into consideration the characteristics of the torsional coil spring 4, such as spring constant, limit angle of the torsional angle, and the like. FIG. 4 is a graph illustrating a case in which when the torsional angle is the angle θ2, the front end region (other end region) 4b and the outer circumferential surface of the middle region of the torsional coil spring 4 are brought into contact with the inner circumferential surface of the outer cylinder portion 3b of the second rotatable body 3 and the annular surface 2b of the first rotatable body 2 almost, respectively at the same time.

Subsequently, a case will be described in which the rotating speed of the first rotatable body 2 is lower than the rotating speed of the second rotatable body 3, that is, the first rotatable body 2 is decelerated. In this case, the first rotatable body 2 rotates relative to the second rotatable body 3 in an opposite direction of the rotation direction (direction of the arrow in FIG. 2 and FIG. 3).

In association with the relative rotation of the first rotatable body 2, since the rear end region of the torsional coil spring 4 together with the press contact surface 2a of the first rotatable body 2 rotates relative to the second rotatable body 3, the torsional coil spring 4 is twisted in a diameter decreasing direction.

When the torsional angle of the torsional coil spring 4 in the diameter decreasing direction is less than a predetermined angle θ3 (for example, 10°), the press contact force of the rear end region of the torsional coil spring 4 against the press contact surface 2a decreases slightly compared to when the torsional angle is zero, but the rear end region of the torsional coil spring 4 is in press contact with the press contact surface 2a. Further, the press contact force of the front end region of the torsional coil spring 4 against the contact surface 3c increases slightly compared to when the torsional angle is zero.

When the torsional angle of the torsional coil spring 4 in the diameter decreasing direction is greater than or equal to θ3, the press contact force of the rear end region of the torsional coil spring 4 against the press contact surface 2a becomes almost zero and the rear end region of the torsional coil spring 4 slides against the press contact surface 2a in the circumferential direction. Accordingly, torque is not transmitted between the two rotatable bodies 2 and 3.

As described above, since the torsional coil spring 4 is twisted when the two rotatable bodies 2 and 3 rotate relative to each other, the pulley structure 1 of this embodiment can absorb a change of rotation. Since the torsional coil spring 4 can be deformed up to the predetermined torsional angle θ2 in the diameter increasing direction, it is possible to absorb a change of rotation over a wide range of torsional angles.

In a state where the pulley structure 1 is in the stopped state, the outer circumferential surface of the rear end region of the torsional coil spring 4 is pushed against the first rotatable body 2 due to the self elastic restoring force in the diameter increasing direction and the inner circumferential surface of the front end region (other end region) 4b is in contact with the second rotatable body 3, so that the torsional coil spring 4 is fixed to the two rotatable bodies 2 and 3.

When the two rotatable bodies 2 and 3 rotate relative to each other and the torsional coil spring 4 is twisted in the diameter increasing direction, the inner circumferential surface of the front end region (other end region) 4b of the torsional coil spring 4 separates from the second rotatable body 3 due to a deformation of the torsional coil spring 4 in the diameter increasing direction, so that the number of active turns of the torsional coil spring 4 increases compared to when the pulley structure 1 is in the stopped state. Accordingly, since in the pulley structure 1 of this embodiment, the spring constant can be reduced by increasing the number of active turns of the torsional coil spring 4, it is possible to improve the fatigue resistance of the torsional coil spring 4 without increasing the number of turns of the coil spring (without increasing the size of the pulley structure) compared to a conventional pulley structure in which an inner circumferential surface or an outer circumferential surface of each of opposite end portions of a coil spring is fixed to rotatable bodies even when rotating relative to each other.

In this embodiment, since the second rotatable body 3 has the contact surface 3d that faces the front end surface 4a of the torsional coil spring 4, when the torsional coil spring 4 is twisted in the diameter increasing direction, the front end surface 4a of the torsional coil spring 4 is brought into contact with the contact surface 3d of the second rotatable body 3. Therefore, it is possible to fix the torsional coil spring 4 to the second rotatable body 3.

In this embodiment, when the front end surface 4a of the torsional coil spring 4 is in contact with the contact surface 3d, the outer circumferential surface of the front end region (other end region) 4b of the torsional coil spring 4 is not in contact with the inner circumferential surface of the outer cylinder portion 3b of the second rotatable body 3. Therefore, it possible to fix the front end region (other end region) 4b of the torsional coil spring 4 by the contact surface 3d alone and it is possible to increase the number of active turns of the torsional coil spring 4.

In this embodiment, since the gap L1 is present between the outer circumferential surface of the front end region (other end region) 4b of the torsional coil spring 4 and the inner circumferential surface of the outer cylinder portion 3b of the second rotatable body 3 in a state where the pulley structure 1 is in the stopped state, when the torsional coil spring 4 is twisted in the diameter increasing direction, the front end region (other end region) 4b of the torsional coil spring 4 can be easily deformed in the diameter increasing direction to separate the inner circumferential surface of the front end region (other end region) 4b from the contact surface 3c.

In this embodiment, since the gap M1 is present between the outer circumferential surface of the middle region of the torsional coil spring 4 and the annular surface 2b of the first rotatable body 2 in a state where the pulley structure 1 is in the stopped state, when the torsional coil spring 4 is twisted in the diameter increasing direction, it is possible to easily deform the torsional coil spring 4 in the diameter increasing direction.

By satisfying L1≤M1, when the torsional angle of the torsional coil spring increases in the diameter increasing direction and the outer circumferential surface of the front end region (other end region) 4b of the torsional coil spring is brought into contact with the inner circumferential surface of the outer cylinder portion 3b of the second rotatable body 3, almost at the same time or when the torsional angle further increases, the outer circumferential surface of the middle region of the torsional coil spring 4 is brought into contact with the annular surface 2b of the first rotatable body 2. Accordingly, a further deformation of the torsional coil spring 4 in the diameter increasing direction can be limited and the torsional coil spring 4 can be prevented from being damaged. Since the outer circumferential surface of the torsional coil spring 4 is brought into contact with the rotatable bodies 2 and 3, the number of active turns of the torsional coil spring 4 changes in a stepwise manner. Accordingly, it is possible to make the pulley structure having three or more spring constants.

Second Embodiment

Subsequently, a pulley structure 101 of a second embodiment of the present invention will be described. The same reference signs are assigned to components having the same configurations as the first embodiment and descriptions thereof will be appropriately omitted.

Figure 5:
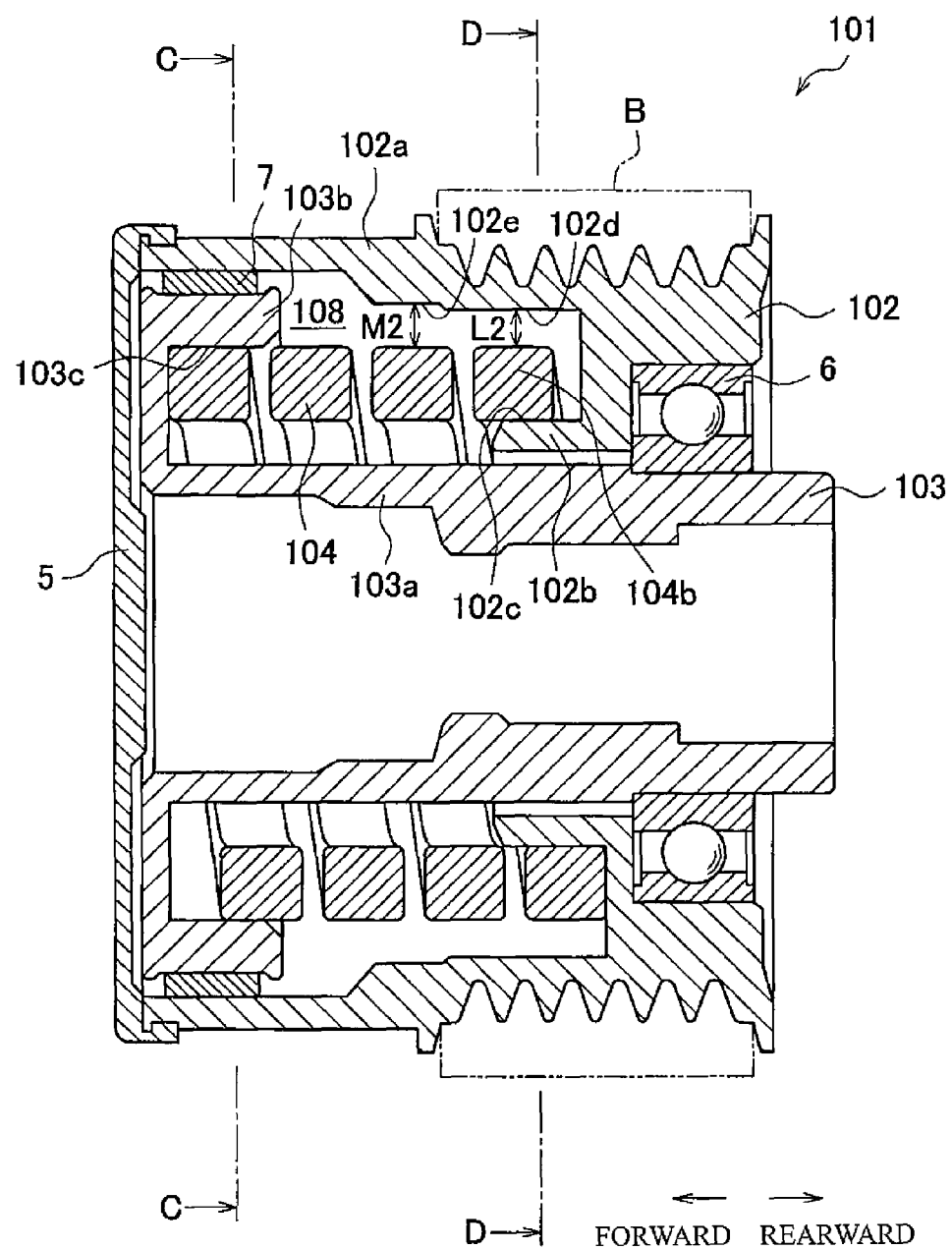
FIG. 5 is a cross-sectional view of a pulley structure of the second embodiment of the present invention.
Figure 6:
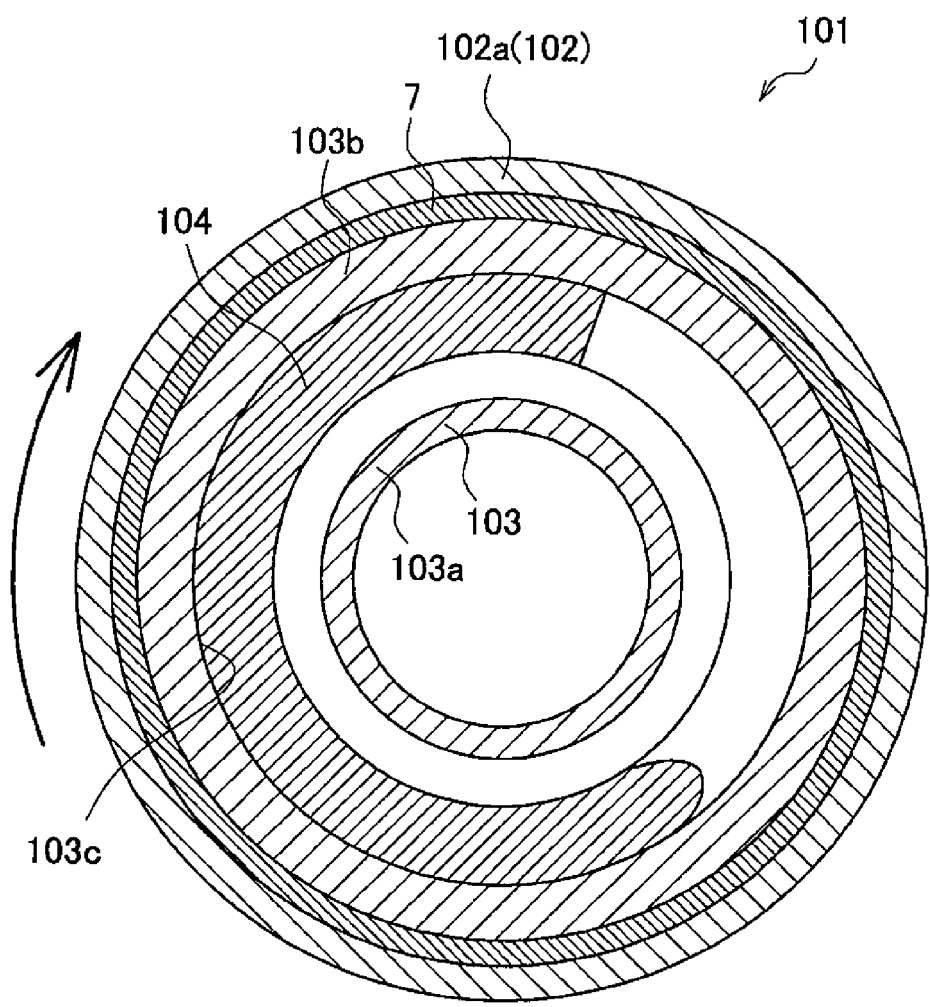
FIG. 6 is a cross-sectional view taken along line C-C in FIG. 5.
Figure 7:
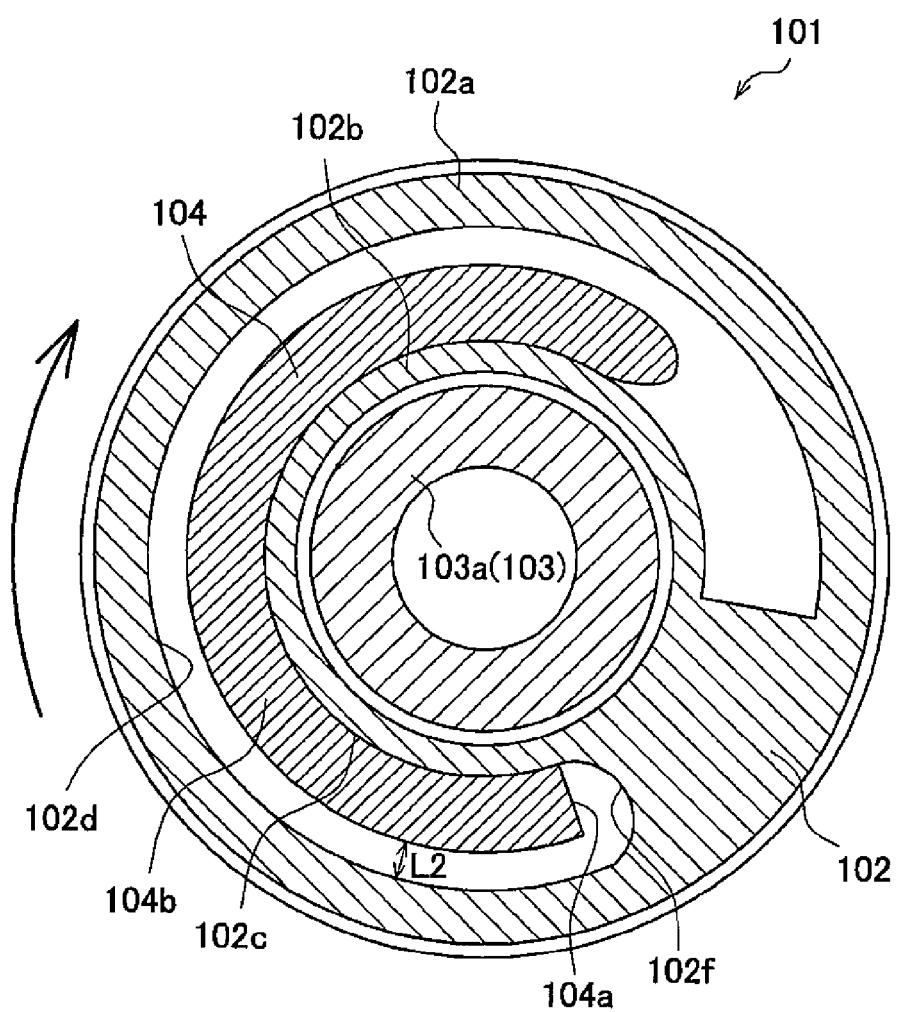
FIG. 7 is a cross-sectional view taken along line D-D in FIG. 5.

Similar to the first embodiment, the pulley structure 101 of this embodiment is installed on the drive shaft of an alternator of an auxiliary unit drive system. As illustrated in FIG. 5 to FIG. 7, the pulley structure 101 includes a first rotatable body 102 having a substantially cylindrical shape, over which belt B is stretched; a second rotatable body 103 having a substantially cylindrical shape and disposed inward of the first rotatable body 102 with the same rotation axis; a torsional coil spring 104; and an end cap 5.

The first rotatable body 102 has a cylinder main body 102a over which the belt B is stretched, and an inner cylinder portion 102b which is disposed inward of the cylinder main body 102a and has an axial length shorter than that of the cylinder main body 102a. The second rotatable body 103 has a cylinder main body 103a that is fixed to the outer circumference of the drive shaft (not illustrated) of the alternator in a fitting manner, and an outer cylinder portion 103b that is disposed outward of a front end portion of the cylinder main body 103a. Similar to the first embodiment, the first rotatable body 102 and the second rotatable body 103 are connected to each other via the two bearings 6 and 7 in a state of being rotatable relative to each other.

A spring accommodating space 108 in which the torsional coil spring 104 is accommodated is formed between the first rotatable body 102 and the second rotatable body 103 and forward of the roller bearing 6. The spring accommodating space 108 is a space that is formed between an inner circumferential surface of the cylinder main body 102a of the first rotatable body 102 and an inner circumferential surface of the outer cylinder portion 103b of the second rotatable body 103, and an outer circumferential surface of the inner cylinder portion 102b of the first rotatable body 102 and an outer circumferential surface of the cylinder main body 103a of the second rotatable body 103.

The outer diameter of the inner cylinder portion 102b of the first rotatable body 102 is greater than the outer diameter of a portion of the cylinder main body 103a of the second rotatable body 103 in the spring accommodating space 108. Hereinafter, the outer circumferential surface of the inner cylinder portion 102b of the first rotatable body 102 is referred to as a contact surface 102c.

The inner diameter of the cylinder main body 102a of the first rotatable body 102 decreases in two stages in the rearward direction in the spring accommodating space 108. An inner circumferential surface of a portion having the smallest inner diameter is referred to as an annular surface 102d, and an inner circumferential surface of a portion having the second smallest inner diameter is referred to as an annular surface 102e.

The inner diameter of the outer cylinder portion 103b of the second rotatable body 103 is less than the diameter of the annular surface 102d of the cylinder main body 102a of the first rotatable body 102. Hereinafter, an inner circumferential surface of the outer cylinder portion 103b of the second rotatable body 103 is referred to as a press contact surface 103c.

Similar to the first embodiment, the torsional coil spring 104 is left-handed, and the diameter thereof without an external force applied thereto is constant over the entire length thereof. The torsional coil spring 104 has a front end region (one end region); a middle region; and a rear end region (other end region) 104b. The outer diameter of the torsional coil spring 104 without an external force applied thereto is larger than the inner diameter of the press contact surface 103c of the second rotatable body 103. The torsional coil spring 104 is accommodated in the spring accommodating space 108 with the diameter of the front end region thereof reduced, and an outer circumferential surface of the front end region (one end region) of the torsional coil spring 104 is pushed against the press contact surface 103c of the second rotatable body 103 due to the self elastic restoring force of the torsional coil spring 104 in a diameter increasing direction.

In a state where the pulley structure 101 is in the stopped state and the outer circumferential surface of the front end region (one end region) of the torsional coil spring 104 is pushed against the press contact surface 103c due to the self elastic restoring force, the rear end region (other end region) 104b of the torsional coil spring 104 is in contact with the contact surface 102c of the first rotatable body 102 with the diameter thereof slightly increased. That is, in a state where the pulley structure 101 is in the stopped state, an inner circumferential surface of the rear end region (other end region) 104b of the torsional coil spring 104 is pushed against the contact surface 102c of the first rotatable body 102. The rear end region (other end region) 104b is a region that extends halfway or more (greater than or equal to 180° about the rotation axis) from a rear tip (other end) of the torsional coil spring 104.

In a state where the inner circumferential surface of the rear end region (other end region) 104b of the torsional coil spring 104 is in contact with the contact surface 102c, a gap L2 is formed between an outer circumferential surface of the rear end region (other end region) 104b of the torsional coil spring 104 and the inner circumferential surface (the annular surface 102d) of the cylinder main body 102a of the first rotatable body 102.

A gap M2 is formed between the annular surface 102e of the first rotatable body 102 and an outer circumferential surface of the middle region of the torsional coil spring 104. In a state where the inner circumferential surface of the rear end region (other end region) 104b of the torsional coil spring 104 is in contact with the contact surface 102c, the gap M2 is greater than the gap L2 (L2<M2).

As illustrated in FIG. 7, a circular arc-shaped contact surface 102f is formed at the position of a rear end portion of the spring accommodating space 108 in the first rotatable body 102, which faces a rear end surface 104a of the torsional coil spring 104 in a circumferential direction.

Subsequently, the operation of the pulley structure 101 will be described.

First, a case will be described in which the rotating speed of the first rotatable body 102 is higher than the rotating speed of the second rotatable body 103. In this case, the first rotatable body 102 rotates relative to the second rotatable body 103 in the same rotation direction (direction of the arrow in FIG. 6 and FIG. 7).

In association with the relative rotation of the first rotatable body 102, the rear end region (other end region) 104b of the torsional coil spring 104 together with the contact surface 102c of the first rotatable body 102 rotates relative to the second rotatable body 103. Accordingly, the torsional coil spring 104 is twisted in the diameter increasing direction.

The press contact force of the front end region of the torsional coil spring 104 against the press contact surface 103c increases further as the torsional angle of the torsional coil spring 104 increases.

When the torsional angle of the torsional coil spring 104 in the diameter increasing direction is less than a predetermined angle $\theta 11$ (equivalent to $\theta 1$ in the first embodiment), the press contact force of the rear end region (other end region) 104b of the torsional coil spring 104 against the contact surface 102c decreases slightly compared to when the torsional angle is zero, but the rear end region (other end region) 104b of the torsional coil spring 104 is in press contact with the contact surface 102c.

When the torsional angle of the torsional coil spring 104 in the diameter increasing direction is greater than or equal to angle θ11 (less than θ12), the rear end region (other end region) 104b of the torsional coil spring 104 is in contact with the contact surface 102c with the press contact force being almost zero, or the inner circumferential surface of at least a circumferential portion of the rear end region (other end region) 104b separates from the contact surface 102c, and the rear end surface 104a of the torsional coil spring 104 is pressed against the contact surface 102f of the first rotatable body 102 in the circumferential direction. Accordingly, after that, since the torsional coil spring 104 is fixed to the first rotatable body 102 by only the rear end surface 104a, the number of active turns of the torsional coil spring 104 increases and a spring constant decreases compared to when the torsional angle is less than θ11.

When the torsional angle of the torsional coil spring 104 in the diameter increasing direction becomes a predetermined angle θ12 (equivalent to θ2 in the first embodiment), the outer circumferential surface of the rear end region (other end region) 104b of the torsional coil spring 104 is brought into contact with the annular surface 102d of the cylinder main body 102a of the first rotatable body 102. Almost at the same time or when the torsional angle increases further than that, the outer circumferential surface of the middle region of the torsional coil spring 104 is brought into contact with the annular surface 102e of the cylinder main body 102a of the first rotatable body 102 or the torsional angle reaches a limit angle, so that a further deformation of the torsional coil spring 104 in the diameter increasing direction is limited and the first rotatable body 102 rotates integrally with the second rotatable body 103. Accordingly, damage of the torsional coil spring 104 due to a deformation in the diameter increasing direction can be prevented. The size of each of the gaps L2 and M2 in the state where the pulley structure is in the stopped state is set, taking into consideration the characteristics of the torsional coil spring 104, such as spring constant, limit angle of the torsional angle, and the like.

Subsequently, a case will be described in which the rotating speed of the first rotatable body 102 is lower than the rotating speed of the second rotatable body 103. In this case, the first rotatable body 102 rotates relative to the second rotatable body 103 in an opposite direction of the rotation direction (direction of the arrow in FIG. 6 and FIG. 7).

In association with the relative rotation of the first rotatable body 102, since the rear end region (other end region) 104b of the torsional coil spring 104 together with the contact surface 102c of the first rotatable body 102 rotates relative to the second rotatable body 103, the torsional coil spring 104 is twisted in a diameter decreasing direction.

When the torsional angle of the torsional coil spring 104 in the diameter decreasing direction is less than a predetermined angle θ13 (equivalent to θ3 in the first embodiment), the press contact force of the front end region of the torsional coil spring 104 against the press contact surface 103c decreases slightly compared to when the torsional angle is zero, but the front end region of the torsional coil spring 104 is in press contact with the press contact surface 103c. In addition, the press contact force of the rear end region (other end region) 104b of the torsional coil spring 104 against the contact surface 102c increases slightly compared to when the torsional angle is zero.

When the torsional angle of the torsional coil spring 104 in the diameter decreasing direction is greater than or equal to θ13, the press contact force of the front end region of the torsional coil spring 104 against the press contact surface 103c becomes almost zero, the front end region of the torsional coil spring 104 slides against the press contact surface 103c in the circumferential direction. Accordingly, torque is not transmitted between the two rotatable bodies 102 and 103.

Similar to the pulley structure 1 of the first embodiment, since the torsional coil spring 104 is twisted when the two rotatable bodies 102 and 103 rotate relative to each other, the pulley structure 101 of this embodiment can absorb a change of rotation. When the rotating speed of the first rotatable body 102 is higher than that of the second rotatable body 103, the spring constant can be decreased by increasing the number of active turns of the torsional coil spring 104. As a result, it is possible to improve the fatigue resistance of the torsional coil spring 104 without increasing the number of turns of the coil spring (without increasing the size of the pulley structure) compared to a conventional pulley structure in which an inner circumferential surface or an outer circumferential surface of each of opposite end portions of a coil spring is fixed to rotatable bodies even when rotating relative to each other. It is possible to obtain the same effects as the first embodiment by providing the gaps L2 and M2.

Third Embodiment

Subsequently, a pulley structure 201 of a third embodiment of the present invention will be described. The same reference signs are assigned to components having the same configurations as the first embodiment, and descriptions thereof will be appropriately omitted.

Figure 8:
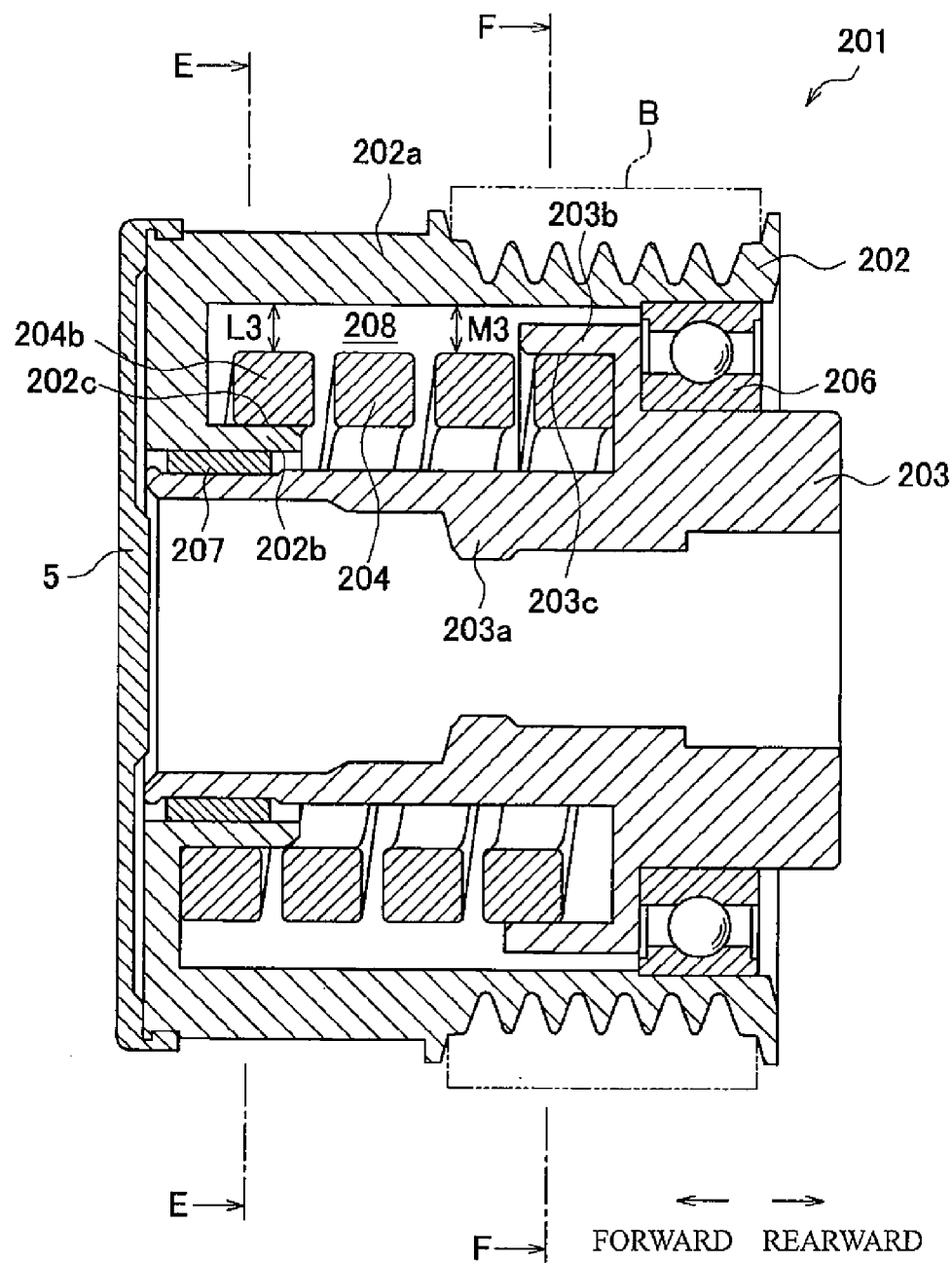
FIG. 8 is a cross-sectional view of a pulley structure of the third embodiment of the present invention.
Figure 9:
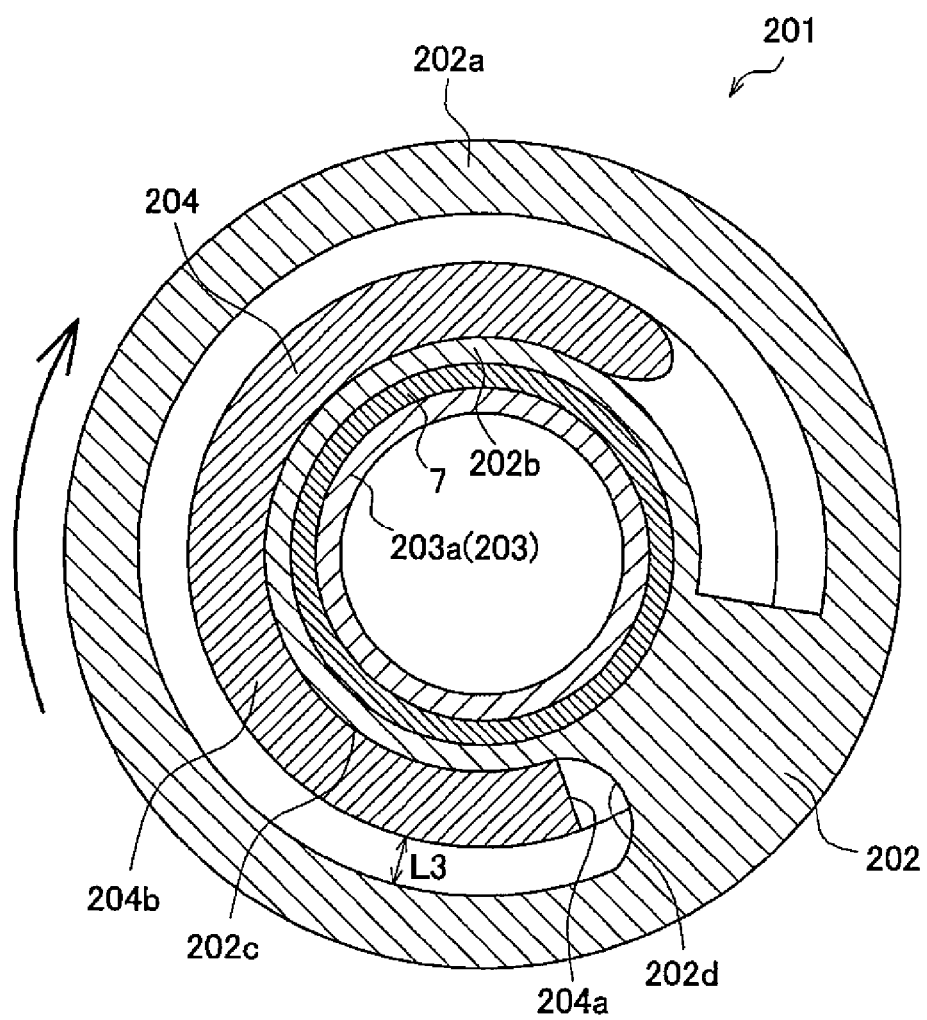
FIG. 9 is a cross-sectional view taken along line E-E in FIG. 8.
Figure 10:
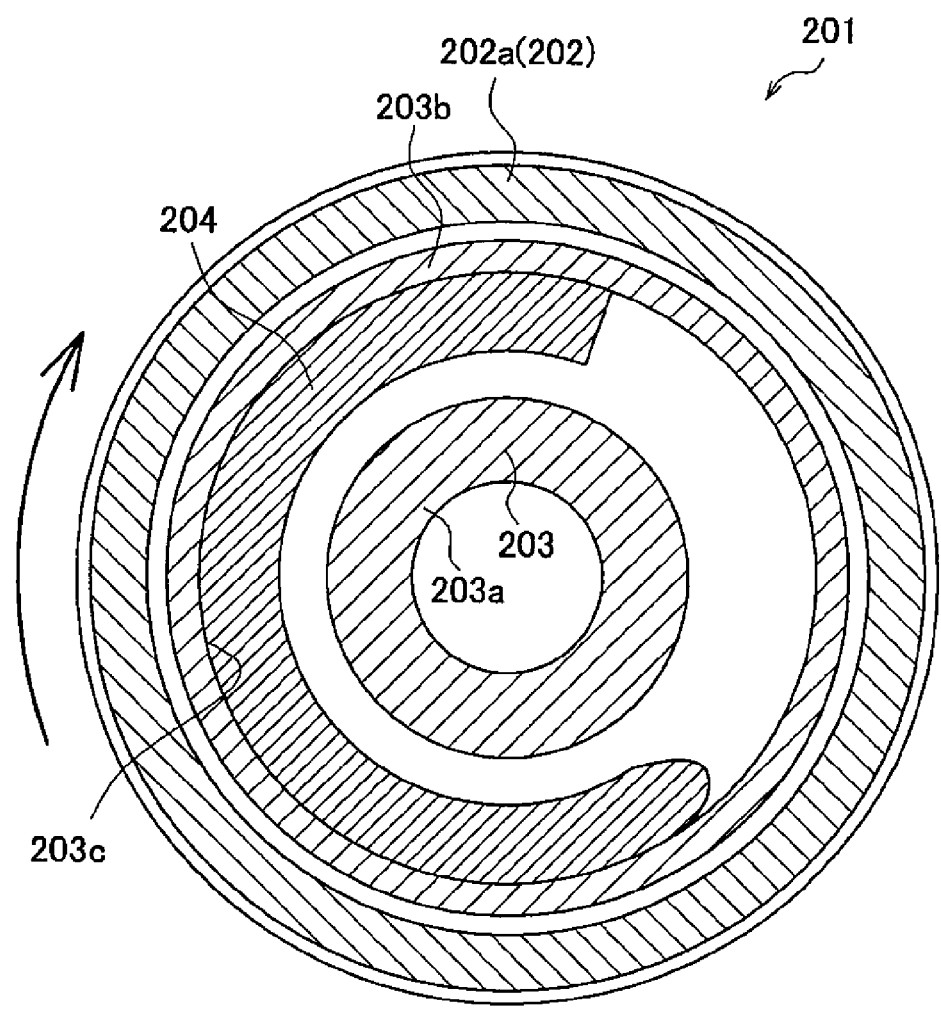
FIG. 10 is a cross-sectional view taken along line F-F in FIG. 8.

Similar to the first embodiment, the pulley structure 201 of this embodiment is installed on the drive shaft of an alternator of an auxiliary unit drive system. As illustrated in FIG. 8 to FIG. 10, the pulley structure 201 includes a first rotatable body 202 having a substantially cylindrical shape, over which belt B is stretched; a second rotatable body 203 having a substantially cylindrical shape and disposed inward of the first rotatable body 202 with the same rotation axis; a torsional coil spring 204; and an end cap 5.

The first rotatable body 202 has a cylinder main body 202a over which the belt B is stretched, and an inner cylinder portion 202b which is disposed inward of a front end portion of the cylinder main body 202a. The second rotatable body 203 has a cylinder main body 203a that is fixed to the outer circumference of the drive shaft (not illustrated) of the alternator in a fitting manner, and an outer cylinder portion 203b which is disposed outward of the cylinder main body 203a and has an axial length shorter than that of the cylinder main body 203a.

A roller bearing 206 is provided between an inner circumferential surface of a rear end portion of the cylinder main body 202a of the first rotatable body 202 and an outer circumferential surface of the cylinder main body 203a of the second rotatable body 203. A slide bearing 207 is provided between an inner circumferential surface of the inner cylinder portion 202b of the first rotatable body 202 and an outer circumferential surface of the cylinder main body 203a of the second rotatable body 203. The first rotatable body 202 and the second rotatable body 203 are connected to each other via the two bearings 206 and 207 in a state of being rotatable relative to each other.

The spring accommodating space 208 in which the torsional coil spring 204 is accommodated is formed between the first rotatable body 202 and the second rotatable body 203 and forward of the roller bearing 206. The spring accommodating space 208 is a space that is formed between an inner circumferential surface of the cylinder main body 202a of the first rotatable body 202 and an inner circumferential surface of the outer cylinder portion 203b of the second rotatable body 203, and an outer circumferential surface of the inner cylinder portion 202b of the first rotatable body 202 and the outer circumferential surface of the cylinder main body 203a of the second rotatable body 203.

The outer diameter of the inner cylinder portion 202b of the first rotatable body 202 is greater than the outer diameter of a portion of the cylinder main body 203a of the second rotatable body 203 in the spring accommodating space 208. Hereinafter, the outer circumferential surface of the inner cylinder portion 202b of the first rotatable body 202 is referred to as a contact surface 202c.

The inner diameter of the outer cylinder portion 203b of the second rotatable body 203 is less than the inner diameter of a portion of the cylinder main body 202a of the first rotatable body 202 in the spring accommodating space 208. Hereinafter, the inner circumferential surface of the outer cylinder portion 203b of the second rotatable body 203 is referred to as a press contact surface 203c.

The torsional coil spring 204 is right-handed (wound in a clockwise direction toward the tip of the axial direction), and the diameter thereof without an external force applied thereto is constant over the entire length thereof. The torsional coil spring 204 has a rear end region (one end region); a middle region; and a front end region (other end region) 204b. The outer diameter of the torsional coil spring 204 without an external force applied thereto is larger than the inner diameter of the press contact surface 203c of the second rotatable body 203. The torsional coil spring 204 is accommodated in the spring accommodating space 208 with the diameter of the rear end region reduced, and an outer circumferential surface of the rear end region (one end region) of the torsional coil spring 204 is pushed against the press contact surface 203c of the second rotatable body 203 due to the self elastic restoring force of the torsional coil spring 204 in a diameter increasing direction.

In a state where the pulley structure 201 is in the stopped state and the outer circumferential surface of the rear end region (one end region) of the torsional coil spring 204 is pushed against the press contact surface 203c due to the self elastic restoring force, the front end region (other end region) 204b of the torsional coil spring 204 is in contact with the contact surface 202c of the first rotatable body 202 with the diameter slightly increased. That is, in a state where the pulley structure 201 is in the stopped state, an inner circumferential surface of the front end region (other end region) 204b of the torsional coil spring 204 is pushed against the contact surface 202c of the first rotatable body 202. The front end region (other end region) 204b is a region that extends halfway or more (greater than or equal to 180° about the rotation axis) from a front tip (other end) of the torsional coil spring 204.

In a state where the inner circumferential surface of the front end region (other end region) 204b of the torsional coil spring 204 is in contact with the contact surface 202c, a gap L3 is formed between an outer circumferential surface of the front end region (other end region) 204b of the torsional coil spring 204 and the inner circumferential surface of the cylinder main body 202a of the first rotatable body 202.

A gap M3 is formed between an outer circumferential surface of the middle region of the torsional coil spring 204 and the inner circumferential surface of the cylinder main body 202a of the first rotatable body 202. The gap M3 has substantially the same size as the gap L3.

As illustrated in FIG. 9, a circular arc-shaped contact surface 202d is formed in a front end portion of the first rotatable body 202, which faces a front end surface 204a of the torsional coil spring 204 in a circumferential direction.

Subsequently, the operation of the pulley structure 201 will be described.

First, a case will be described in which the rotating speed of the first rotatable body 202 is higher than the rotating speed of the second rotatable body 203. In this case, the first rotatable body 202 rotates relative to the second rotatable body 203 in the same direction as the rotation direction (direction of the arrow in FIG. 9 and FIG. 10).

In association with the relative rotation of the first rotatable body 202, the front end region (other end region) 204b of the torsional coil spring 204 together with the contact surface 202c of the first rotatable body 202 rotates relative to the second rotatable body 203. Accordingly, the torsional coil spring 204 is twisted in the diameter increasing direction.

The press contact force of the rear end region of the torsional coil spring 204 against the press contact surface 203c increases further as the torsional angle of the torsional coil spring 204 increases.

When the torsional angle of the torsional coil spring 204 in the diameter increasing direction is less than a predetermined angle θ21 (equivalent to θ1 in the first embodiment), the press contact force of the front end region (other end region) 204b of the torsional coil spring 204 against the contact surface 202c decreases slightly compared to when the torsional angle is zero, but the front end region (other end region) 204b of the torsional coil spring 204 is in press contact with the contact surface 202c.

When the torsional angle of the torsional coil spring 204 in the diameter increasing direction is greater than or equal to the angle θ21 (less than angle θ22), the front end region (other end region) 204b of the torsional coil spring 204 is in contact with the contact surface 202c with the press contact force being almost zero or the inner circumferential surface of at least a circumferential portion of the front end region (other end region) 204b separates from the contact surface 202c, and the front end surface 204a of the torsional coil spring 204 is pressed against the contact surface 202d of the first rotatable body 202 in the circumferential direction. Accordingly, since the torsional coil spring 204 is fixed to the first rotatable body 202 by only the front end surface 204a, the number of active turns of the torsional coil spring 204 increases and a spring constant decreases compared to when the torsional angle is less than the angle θ21.

When the torsional angle of the torsional coil spring 204 in the diameter increasing direction becomes a predetermined angle θ22 (equivalent to θ2 in the first embodiment), the front end region (other end region) 204b of the torsional coil spring 204 is pushed against the inner circumferential surface of the cylinder main body 202a of the first rotatable body 202. Almost at the same time or when the torsional angle increases further than that, the outer circumferential surface of the middle region of the torsional coil spring 204 is pushed against the inner circumferential surface of the cylinder main body 202a of the first rotatable body 202 or the torsional angle reaches a limit angle, so that a further deformation of the torsional coil spring 204 in the diameter increasing direction is limited and the first rotatable body 202 rotates integrally with the second rotatable body 203. Accordingly, damage of the torsional coil spring 204 due to a deformation in the diameter increasing direction can be prevented. The size of each of the gaps L3 and M3 in the state where pulley structure is in the stopped state is set, taking into consideration the characteristics of the torsional coil spring 204, such as spring constant, limit angle of the torsional angle, and the like.

Subsequently, a case will be described in which the rotating speed of the first rotatable body 202 is lower than the rotating speed of the second rotatable body 203. In this case, the first rotatable body 202 rotates relative to the second rotatable body 203 in an opposite direction of the rotation direction (direction of the arrow in FIG. 9 and FIG. 10).

In association with the relative rotation of the first rotatable body 202, since the front end region (other end region) 204b of the torsional coil spring 204 together with the contact surface 202c of the first rotatable body 202 rotates relative to the second rotatable body 203, the torsional coil spring 204 is twisted in a diameter decreasing direction.

When the torsional angle of the torsional coil spring 204 in the diameter decreasing direction is less than a predetermined angle θ23 (equivalent to θ3 in the first embodiment), the press contact force of the rear end region of the torsional coil spring 204 against the press contact surface 203c decreases slightly compared to when the torsional angle is zero, but the rear end region of the torsional coil spring 204 is in press contact with the press contact surface 203c. In addition, the press contact force of the front end region (other end region) 204b of the torsional coil spring 204 against the contact surface 202c increases slightly compared to when the torsional angle is zero.

When the torsional angle of the torsional coil spring 204 in the diameter decreasing direction is greater than or equal to the angle θ23, the press contact force of the rear end region of the torsional coil spring 204 against the press contact surface 203c becomes almost zero, and the rear end region of the torsional coil spring 204 slides against the press contact surface 203c in the circumferential direction. Accordingly, torque is not transmitted between the two rotatable bodies 202 and 203.

Similar to the pulley structure 1 of the first embodiment, since the torsional coil spring 204 is twisted when the two rotatable bodies 202 and 203 rotate relative to each other, the pulley structure 201 of this embodiment can absorb a change of rotation. When the rotating speed of the first rotatable body 202 is higher than that of the second rotatable body 203, the spring constant can be decreased by increasing the number of active turns of the torsional coil spring 204. As a result, it is possible to improve the fatigue resistance of the torsional coil spring 204 without increasing the number of turns of the coil spring (without increasing the size of the pulley structure) compared to a conventional pulley structure in which an inner circumferential surface or an outer circumferential surface of each of opposite end portions of a coil spring is fixed to rotatable bodies even when rotating relative to each other. It is possible to obtain the same effects as the first embodiment by providing the gaps L3 and M3.

Fourth Embodiment

Subsequently, a pulley structure 301 of a fourth embodiment of the present invention will be described. The same reference signs are assigned to components having the same configurations as the first embodiment or the third embodiment, and descriptions thereof will be appropriately omitted.

Figure 11:
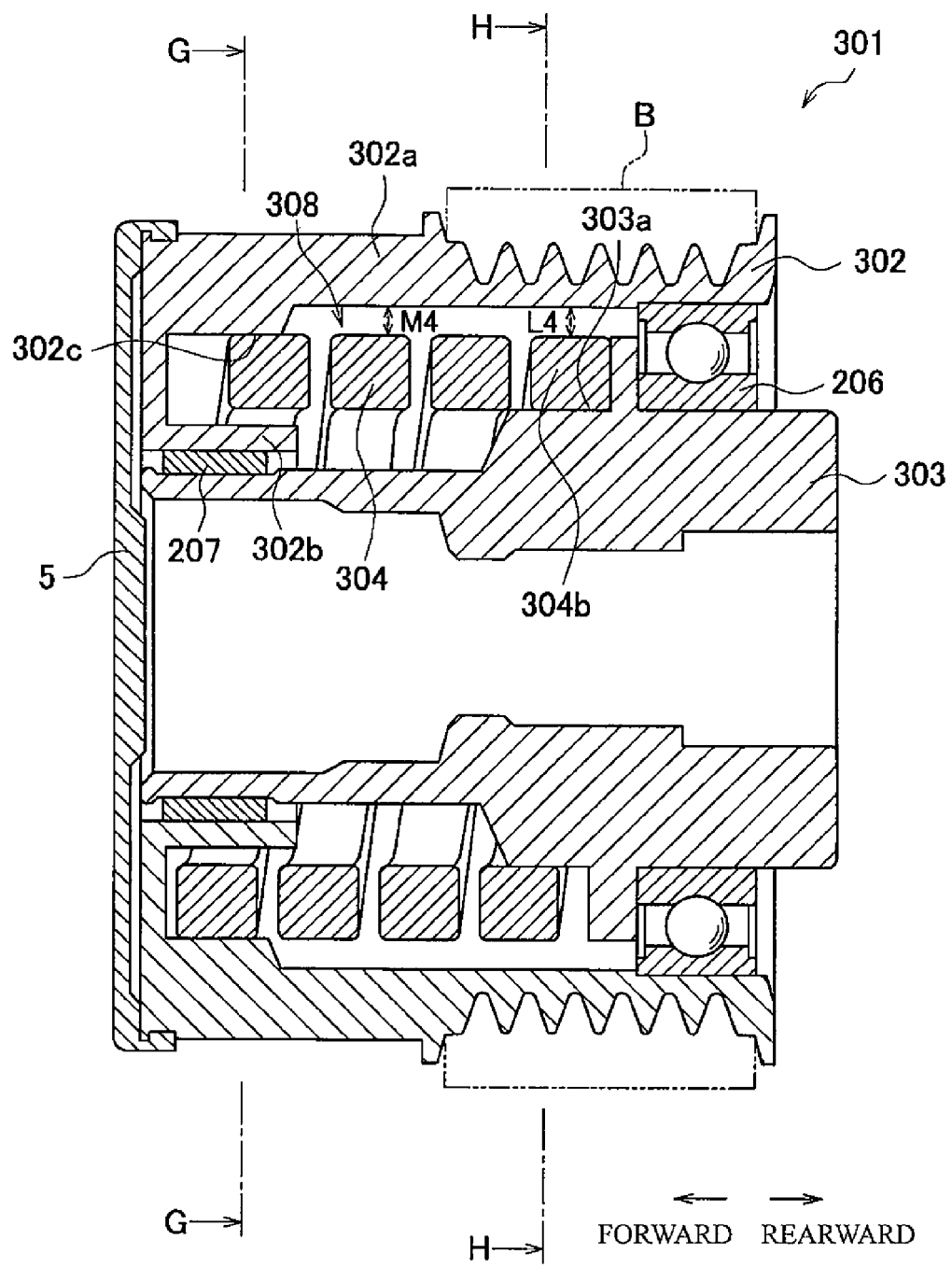
FIG. 11 is a cross-sectional view of a pulley structure of the fourth embodiment of the present invention.
Figure 12:
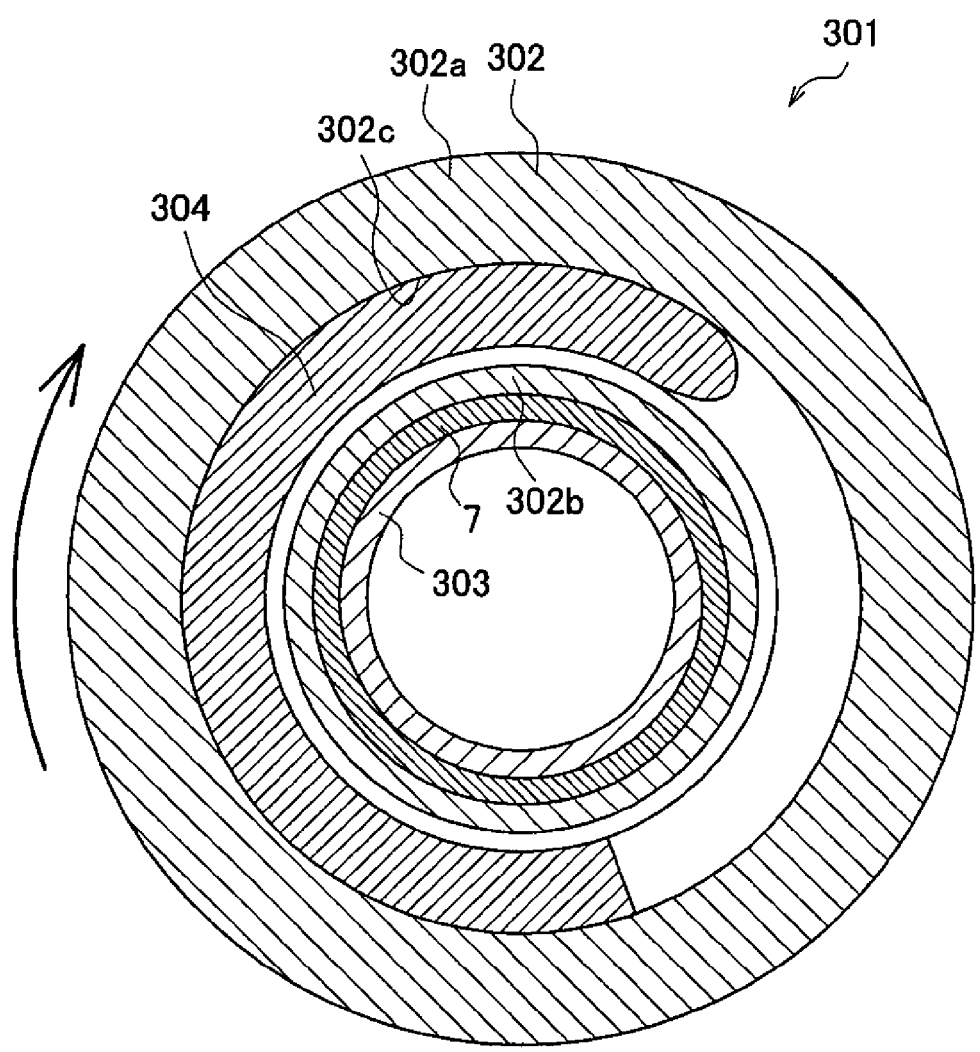
FIG. 12 is a cross-sectional view taken along line G-G in FIG. 11.
Figure 13:
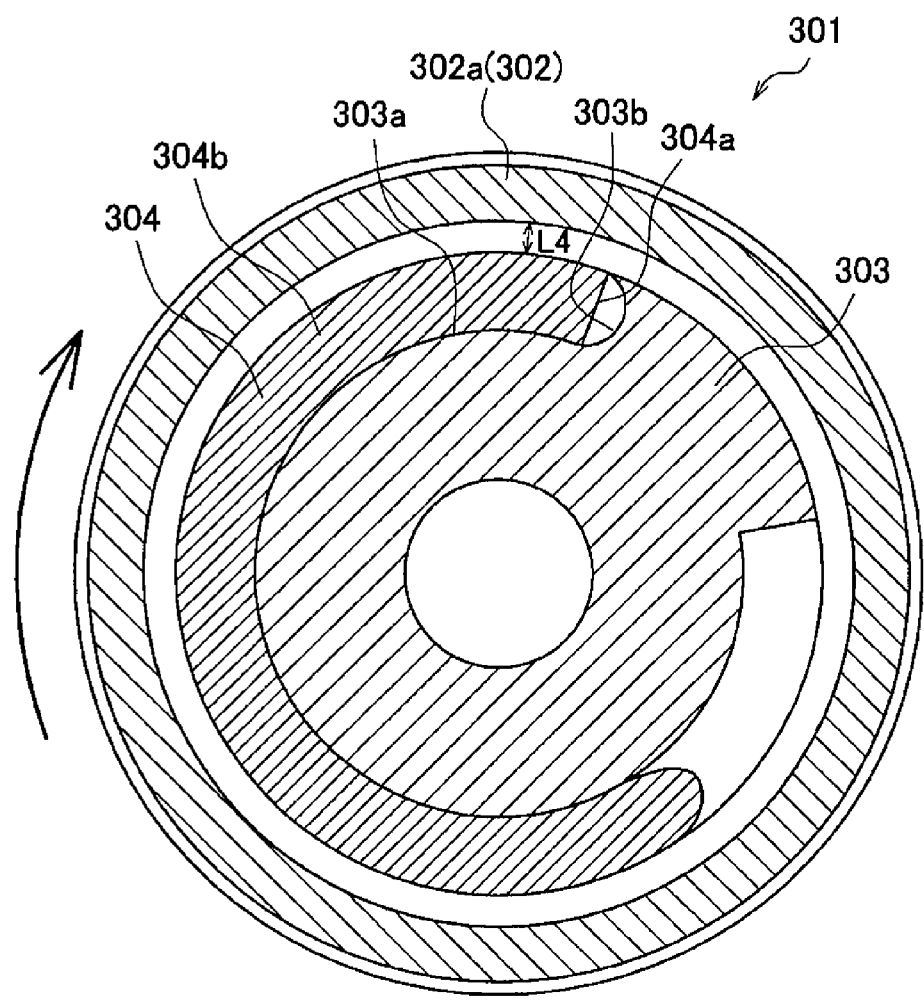
FIG. 13 is a cross-sectional view taken along line H-H in FIG. 11.

Similar to the first embodiment, the pulley structure 301 of this embodiment is installed on the drive shaft of an alternator of an auxiliary unit drive system. As illustrated in FIG. 11 to FIG. 13, the pulley structure 301 includes a first rotatable body 302 having a substantially cylindrical shape, over which belt B is stretched; a second rotatable body 303 having a substantially cylindrical shape and disposed inward of the first rotatable body 302 with the same rotation axis; a torsional coil spring 304; and an end cap 5.

An axis hole is formed in the second rotatable body 303 so as to be fixable to the drive shaft (not illustrated) of the alternator. The first rotatable body 302 has a cylinder main body 302a over which the belt B is stretched, and an inner cylinder portion 302b which is disposed inward of a front end portion of the cylinder main body 302a. Similar to the third embodiment, the first rotatable body 302 and the second rotatable body 303 are connected to each other via the two bearings 206 and 207 in a state of being rotatable relative to each other.

A spring accommodating space 308 in which the torsional coil spring 304 is accommodated is formed between the first rotatable body 302 and the second rotatable body 303, and forward of the roller bearing 206. The spring accommodating space 308 is a space that is formed between an inner circumferential surface of the cylinder main body 302a of the first rotatable body 302, and an outer circumferential surface of the inner cylinder portion 302b of the first rotatable body 302 and an outer circumferential surface of the second rotatable body 303.

The cylinder main body 302a of the first rotatable body 302 has an inner diameter which is smaller at the front end portion than that of other portions in the spring accommodating space 308. The inner circumferential surface of this portion is referred to as a press contact surface 302c. The second rotatable body 303 has an outer diameter which is larger at the position of a rear end portion of the spring accommodating space 308 than that of other portions in the spring accommodating space 308. the outer circumferential surface of this portion is referred to as a contact surface 303a. The diameter of the contact surface 303a is larger than the outer diameter of the inner cylinder portion 302b of the first rotatable body 302.

Similar to the third embodiment, the torsional coil spring 304 is right-handed, and the diameter thereof without an external force applied thereto is constant over the entire length thereof. The torsional coil spring 304 has a front end region (one end region); a middle region; and a rear end region (other end region) 304b. The outer diameter of the torsional coil spring 304 without an external force applied thereto is larger than the inner diameter of the press contact surface 302c of the first rotatable body 302. The torsional coil spring 304 is accommodated in the spring accommodating space 308 with the diameter of the front end region reduced, and an outer circumferential surface of the front end region (one end region) of the torsional coil spring 304 is pushed against the press contact surface 302c of the first rotatable body 302 due to the self elastic restoring force of the torsional coil spring 304 in a diameter increasing direction.

In a state where the pulley structure 301 is in the stopped state and the outer circumferential surface of the front end region (one end region) of the torsional coil spring 304 is pushed against the press contact surface 302c due to the self elastic restoring force, the rear end region (other end region) 304b of the torsional coil spring 304 is in contact with the contact surface 303a of the second rotatable body 303 with the diameter thereof slightly increased. That is, an inner circumferential surface of the rear end region (other end region) 304b of the torsional coil spring 304 is pushed against the contact surface 303a of the second rotatable body 303. The rear end region (other end region) 304b is a region that extends halfway or more (greater than or equal to 180° about the rotation axis) from a rear tip (other end) of the torsional coil spring 304.

In a state where the inner circumferential surface of the rear end region (other end region) 304b of the torsional coil spring 304 is in contact with the contact surface 303a, a gap L4 is formed between an outer circumferential surface of the rear end region (other end region) 304b of the torsional coil spring 304 and the inner circumferential surface of the cylinder main body 302a of the first rotatable body 302.

A gap M4 is formed between an outer circumferential surface of the middle region of the torsional coil spring 304 and the inner circumferential surface of the cylinder main body 302a of the first rotatable body 302. The gap M4 has substantially the same size as the gap L4.

As illustrated in FIG. 13, a circular arc-shaped contact surface 303b is formed at the position of the rear end portion of the spring accommodating space 308 in the second rotatable body 303, which faces a rear end surface 304a of the torsional coil spring 304 in a circumferential direction.

Subsequently, the operation of the pulley structure 301 will be described.

First, a case will be described in which the rotating speed of the first rotatable body 302 is higher than the rotating speed of the second rotatable body 303. In this case, the first rotatable body 302 rotates relative to the second rotatable body 303 in the same direction as the rotation direction (direction of the arrow in FIG. 12 and FIG. 13).

In association with the relative rotation of the first rotatable body 302, the front end region of the torsional coil spring 304 together with the press contact surface 302c of the first rotatable body 302 rotates relative to the second rotatable body 303. Accordingly, the torsional coil spring 304 is twisted in the diameter increasing direction.

The press contact force of the front end region of the torsional coil spring 304 against the press contact surface 302c increases further as the torsional angle of the torsional coil spring 304 increases.

When the torsional angle of the torsional coil spring 304 in the diameter increasing direction is less than a predetermined angle θ31 (equivalent to θ1 in the first embodiment), the press contact force of the rear end region (other end region) 304b of the torsional coil spring 304 against the contact surface 303a decreases slightly compared to when the torsional angle is zero, but the rear end region (other end region) 304b of the torsional coil spring 304 is in press contact with the contact surface 303a.

When the torsional angle of the torsional coil spring 304 in the diameter increasing direction is greater than or equal to the angle θ31 (less than angle θ32), the rear end region (other end region) 304b of the torsional coil spring 304 is in contact with the contact surface 303a with the press contact force being almost zero or the inner circumferential surface of at least a circumferential portion of the rear end region (other end region) 304b separates from the contact surface 303a, so that the rear end surface 304a of the torsional coil spring 304 is pressed against the contact surface 303b of the second rotatable body 303 in the circumferential direction. Accordingly, since the torsional coil spring 304 is fixed to the second rotatable body 303 by only the rear end surface 304a, the number of active turns of the torsional coil spring 304 increases and a spring constant decreases compared to when the torsional angle is less than the predetermined angle θ31.

When the torsional angle of the torsional coil spring 304 in the diameter increasing direction becomes a predetermined angle θ32 (equivalent to θ2 in the first embodiment), the rear end region (other end region) 304b of the torsional coil spring 304 is pushed against the inner circumferential surface of the first rotatable body 302. Almost at the same time or when the torsional angle increases further than that, the outer circumferential surface of the middle region of the torsional coil spring 304 is pushed against the inner circumferential surface of the first rotatable body 302 or the torsional angle reaches a limit angle, so that a further deformation of the torsional coil spring 204 in the diameter increasing direction is limited and the first rotatable body 302 rotates integrally with the second rotatable body 303. Accordingly, damage of the torsional coil spring 304 due to a deformation in the diameter increasing direction can be prevented. The size of each of the gaps L4 and M4 in the state where the pulley structure is in the stopped state is set, taking into consideration the characteristics of the torsional coil spring 304, such as spring constant, limit angle of the torsional angle, and the like.

Subsequently, a case will be described in which the rotating speed of the first rotatable body 302 is lower than the rotating speed of the second rotatable body 303. In this case, the first rotatable body 302 rotates relative to the second rotatable body 303 in an opposite direction of the rotation direction (direction of the arrow in FIG. 12 and FIG. 13).

In association with the relative rotation of the first rotatable body 302, since the front end region of the torsional coil spring 304 together with the press contact surface 302c of the first rotatable body 302 rotates relative to the second rotatable body 303, the torsional coil spring 304 is twisted in a diameter decreasing direction.

When the torsional angle of the torsional coil spring 304 in the diameter decreasing direction is less than a predetermined angle θ33 (equivalent to θ3 in the first embodiment), the press contact force of the front end region of the torsional coil spring 304 against the press contact surface 302c decreases slightly compared to when the torsional angle is zero, but the front end region of the torsional coil spring 304 is in press contact with the press contact surface 302c. In addition, the press contact force of the rear end region (other end region) 304b of the torsional coil spring 304 against the contact surface 303a increases slightly compared to when the torsional angle is zero.

When the torsional angle of the torsional coil spring 304 in the diameter decreasing direction is greater than or equal to the angle θ33, the press contact force of the front end region of the torsional coil spring 304 against the press contact surface 302c becomes almost zero and the front end region of the torsional coil spring 304 slides against the press contact surface 302c in the circumferential direction. Accordingly, torque is not transmitted between the two rotatable bodies 302 and 303.

Similar to the pulley structure 1 of the first embodiment, since this torsional coil spring 304 is twisted when the two rotatable bodies 302 and 303 rotate relative to each other, the pulley structure 301 of this embodiment can absorb a change of rotation. When the rotating speed of the first rotatable body 302 is higher than that of the second rotatable body 303, it is possible to decrease the spring constant by increasing the number of active turns of the torsional coil spring 304. As a result, it is possible to improve the fatigue resistance of the torsional coil spring 304 without increasing the number of turns of the coil spring (without increasing the size of the pulley structure) compared to a conventional pulley structure in which an inner circumferential surface or an outer circumferential surface of each of opposite end portions of a coil spring is fixed to rotatable bodies even when rotating relative to each other. It is possible to obtain the same effects as the first embodiment by providing the gaps L4 and M4.

Fifth Embodiment

Figure 14:
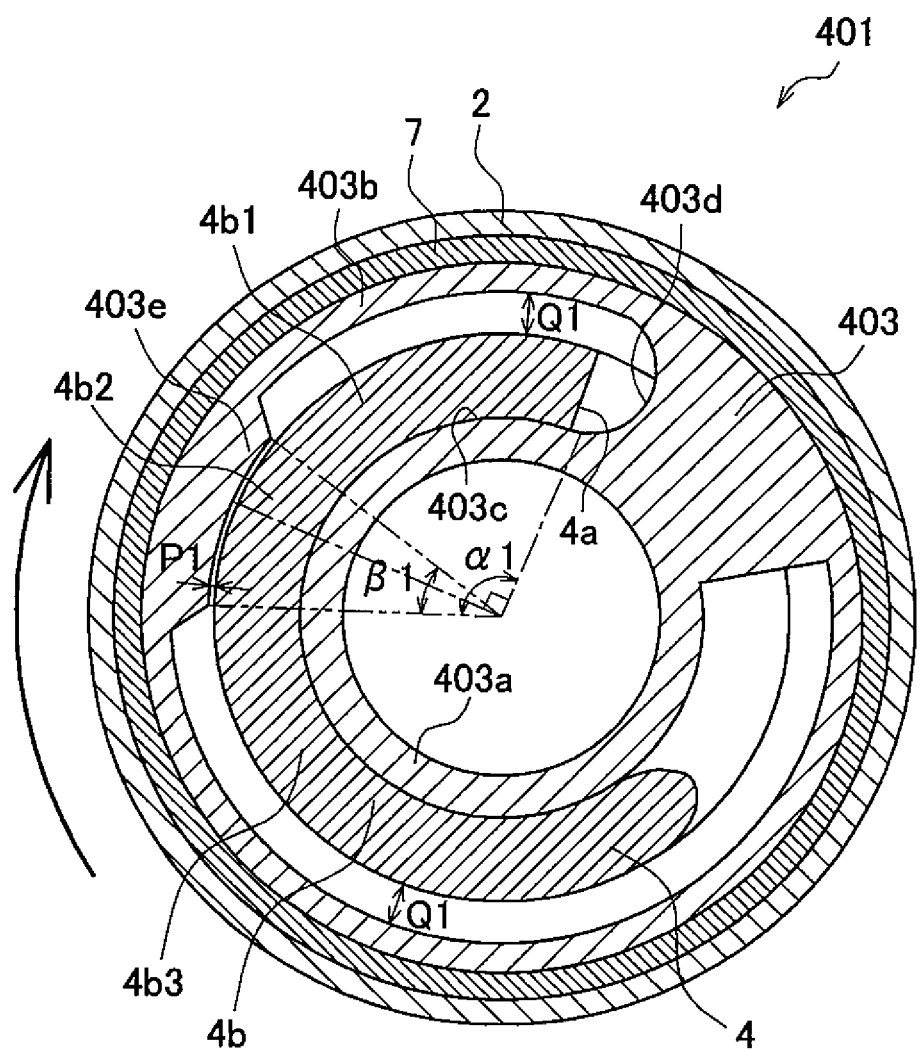
FIG. 14 is a cross-sectional view of a pulley structure of the fifth embodiment of the present invention.

Subsequently, a pulley structure 401 of a fifth embodiment of the present invention will be described. As illustrated in FIG. 14, in the pulley structure 401 of this embodiment, the configuration of a second rotatable body 403 is different from that of the second rotatable body 3 of the first embodiment and other configurations are the same as the first embodiment. The same reference signs are assigned to components having the same configurations as the first embodiment, and descriptions thereof will be appropriately omitted.

The second rotatable body 403 has a cylinder main body 403a having the same configuration as the cylinder main body 3a of the first embodiment and an outer cylinder portion 403b. The second rotatable body 403 has a contact surface 403d having the same configuration as the contact surface 3d of the first embodiment in a connecting portion between the cylinder main body 403a and the outer cylinder portion 403b. In this embodiment, the shape of an inner circumferential surface of the outer cylinder portion 403b is different from that of the outer cylinder portion 3b of the first embodiment, and other configurations are the same as the outer cylinder portion 3b of the first embodiment.

A supporting protrusion 403e that protrudes inwards in a radial direction is provided on the inner circumferential surface of the outer cylinder portion 403b. The supporting protrusion 403e faces the outer circumferential surface of the front end region (other end region) 4b of the torsional coil spring 4. The supporting protrusion 403e is disposed in a region that contains a position distant from the contact surface 403d by 90° about a rotation axis. In FIG. 14, the position distant from the contact surface 403d by 90° about the rotation axis is located in a substantially circumferential center portion of the supporting protrusion 403e, but the position may not be located in the circumferential center portion.

The supporting protrusion 403e is distant from the contact surface 403d in a circumferential direction. An angle α1 about the rotation axis, which is formed by the contact surface 403d and an end portion of the supporting protrusion 403e farther from the contact surface 403d, is preferably less than or equal to 315°. In FIG. 14, the angle α1 is approximately 110', and an angle β1 (an angle about the rotation axis, which is formed by the end portion of the supporting protrusion 403e farther from the contact surface 403d and an end portion thereof closer to the contact surface 403d) of the supporting protrusion 403e is approximately 35°.

Similar to the first embodiment, in a state where the pulley structure 401 is in the stopped state, the inner circumferential surface of the front end region (other end region) 4b of the torsional coil spring 4 is pushed against a contact surface 403c (outer circumferential surface of a front end portion of the cylinder main body 403a) of the second rotatable body 403. In the front end region (other end region) 4b of the torsional coil spring 4, the vicinity of the position distant from the front end surface 4a by 90° about the rotation axis is referred to as a second region 4b2, a region closer to the front end surface 4a than the second region 4b2 is referred to as a first region 4b1, and the remainder is referred to as a third region 4b3. The second region 4b2 faces the supporting protrusion 403e.

In a state where the pulley structure 401 is in the stopped state, a gap (third gap) P1 is formed between an outer circumferential surface of the second region 4b2 of the torsional coil spring 4 and the supporting protrusion 403e. Gaps (fourth gaps) Q1's are formed between an outer circumferential surface of the first region 4b1 and the third region 4b3 of the torsional coil spring 4, and the inner circumferential surface of the outer cylinder portion 403b, respectively. The gap P1 is smaller than the gap Q1.

Subsequently, the operation of the pulley structure 401 will be described.

First, a case will be described in which the rotating speed of the first rotatable body 2 is higher than the rotating speed of the second rotatable body 403, that is, the first rotatable body 2 accelerates. In this case, the first rotatable body 2 rotates relative to the second rotatable body 403 in the same direction as the rotation direction (direction of the arrow in FIG. 14).

In association with the relative rotation of the first rotatable body 2, the rear end region of the torsional coil spring 4 together with the press contact surface 2a of the first rotatable body 2 rotates relative to the second rotatable body 403. Accordingly, the torsional coil spring 4 is twisted in the diameter increasing direction.

Similar to the first embodiment, the press contact force of the rear end region of the torsional coil spring 4 against the press contact surface 2a increases further as the torsional angle of the torsional coil spring 4 increases.

Since the maximum torsional stress is likely to be applied to the vicinity (the second region 4b2) of the position distant from the front end surface 4a of the torsional coil spring 4 by 90° about the rotation axis, when the torsional angle increases, the second region 4b2 of the torsional coil spring 4 separates from the contact surface 403c. At this time, the first region 4b1 and the third region 4b3 are in press contact with the contact surface 403c. Almost at the same time when the second region 4b2 separates from the contact surface 403c or when the torsional angle increases further than that, the outer circumferential surface of the second region 4b2 is brought into contact with the supporting protrusion 403e.

Since the contact between the outer circumferential surface of the second region 4b2 and the supporting protrusion 403e limits (prevents) a deformation of the front end region (other end region) 4b of the torsional coil spring 4 in the diameter increasing direction, torsional stress is distributed to turns other than the front end region (other end region) 4b. In particular, torsional stress applied to rear turns of the torsional coil spring 4 increases. Accordingly, since a difference between torsional stress applied to each turn of the torsional coil spring 4 can be reduced and the entirety of the torsional coil spring 4 can absorb strain energy, a local fatigue failure can be prevented.

The press contact force of the third region 4b3 against the contact surface 403c decreases further as the torsional angle increases, and at the same time when the second region 4b2 is brought into contact with the supporting protrusion 403e or when the torsional angle increases further than that, the press contact force of the third region 4b3 against the contact surface 403c becomes almost zero. The torsional angle at this time is referred to as angle φ1 (for example, 3°).

When the torsional angle exceeds the angle φ1, the inner circumferential surface of at least a circumferential portion of the third region 4b3 separates from the contact surface 403c due to a deformation of the third region 4b3 in the diameter increasing direction; however, the circular arc shape of the front end region (other end region) 4b is maintained without the torsional coil spring 4 curved (bent)

in the vicinity of the boundary between the third region 4b3 and the second region 4b2, that is, in the vicinity of the end portion of the supporting protrusion 403e farther from the contact surface 403d. That is, the shape of the front end region (other end region) 4b is maintained so as to easily slide against the supporting protrusion 403e. For this reason, when the torsional angle increases and torsional stress applied to the front end region (other end region) 4b increases, the front end region (other end region) 4b of the torsional coil spring 4 moves (slides against the supporting protrusion 403e and the contact surface 403c) in the circumferential direction while overcoming the press contact force of the second region 4b2 against the supporting protrusion 403e and the press contact force of the first region 4b1 against the contact surface 403c, and the front end surface 4a of the torsional coil spring 4 is pressed against the contact surface 403d of the second rotatable body 403. Since the front end surface 4a is pressed against the contact surface 403d, torque can be reliably transmitted between the two rotatable bodies 2 and 403.

As such, when the torsional angle of the torsional coil spring 4 in the diameter increasing direction is greater than or equal to the angle φ1 (less than angle φ2), in the front end region (other end region) 4b of the torsional coil spring 4, the third region 4b3 separates from the contact surface 403c (and is not in contact with the inner circumferential surface of the outer cylinder portion 403b) and the second region 4b2 is in press contact with the supporting protrusion 403e. Accordingly, the number of active turns of the torsional coil spring 4 increases compared to when the torsional angle is less than φ1. Accordingly, as illustrated in FIG. 4, when the torsional angle exceeds φ1, the spring constant (the slope of the straight line illustrated in FIG. 4) decreases. Since in the first embodiment, the front end region 4b is fixed to the second rotatable body 3 by only the front end surface 4a at the torsional angle of θ1 to θ2, the slope of the graph of this embodiment at the torsional angle of φ1 to φ2 is greater than the slope of the graph of first embodiment at the torsional angle of θ1 to θ2 (the number of active turns is small).

When the torsional angle becomes a predetermined angle φ2 (for example, 45°), the outer circumferential surface of the middle region of the torsional coil spring 4 is brought into contact with the annular surface 2b of the first rotatable body 2 or the torsional angle reaches a limit angle, so that a further deformation of the torsional coil spring 4 in the diameter increasing direction is limited and the first rotatable body 2 rotates integrally with the second rotatable body 403. Accordingly, damage of the torsional coil spring due to a deformation in the diameter increasing direction can be prevented. The size of each of the gaps P1 and M1 in the state where the pulley structure is in the stopped state is set, taking into consideration the characteristics of the torsional coil spring 4, such as spring constant, limit angle of the torsional angle, and the like.

The operation when the rotating speed of the first rotatable body 2 is lower than the rotating speed of the second rotatable body 403 is the same as the first embodiment.

As described above, similar to the pulley structure 1 of the first embodiment, since the torsional coil spring 4 is twisted when the two rotatable bodies 2 and 403 rotate relative to each other, the pulley structure 401 of this embodiment can absorb a change of rotation.

In a state where the pulley structure 401 is in the stopped state, the outer circumferential surface of the rear end region is pushed against the first rotatable body 2 due to the self elastic restoring force in the diameter increasing direction and the inner circumferential surface of the front end region (other end region) 4b is in contact with the second rotatable body 403, so that the torsional coil spring 4 is fixed to the two rotatable bodies 2 and 403.

When the two rotatable bodies 2 and 403 rotate relative to each other and the torsional coil spring 4 is twisted in the diameter increasing direction, an inner circumferential surface of the third region 4b3 in the front end region (other end region) 4b separates from the second rotatable body 403 due to a deformation of the front end region (other end region) 4b in the diameter increasing direction, so that the number of active turns of the torsional coil spring 4 increases compared to when the pulley structure 401 is in the stopped state. Accordingly, since in the pulley structure 401 of this embodiment, a relative rotation between the two rotatable bodies 2 and 403 increases the number of active turns of the torsional coil spring 4 to decrease the spring constant, it is possible to improve the fatigue resistance of the torsional coil spring 4 without increasing the number of turns of the coil spring (without increasing the size of the pulley structure) compared to the conventional pulley structure in which an inner circumferential surface or an outer circumferential surface of each of opposite end portions of a coil spring is fixed to rotatable bodies even when rotating relative to each other.

In a case where the supporting protrusion 403e is not provided, when the torsional coil spring 4 is twisted in the diameter increasing direction, torsional stress applied to each turn is not constant, torsional stress is concentrated on a front end turn of the torsional coil spring 4 and this turn is most greatly deformed in the diameter increasing direction. However, in this embodiment, since a deformation of the front end region (other end region) 4b in the diameter increasing direction of the torsional coil spring 4 can be limited by the supporting protrusion 403e, it is possible to prevent torsional stress from being concentrated on the front end region (other end region) 4b and it is also possible to reduce a difference between torsional stress applied to each turn of the torsional coil spring 4. As a result, it is possible to prevent a fatigue failure of the torsional coil spring 4.

When the torsional coil spring 4 is twisted in the diameter increasing direction, the supporting protrusion 403e is brought into contact with the outer circumferential surface of the second region 4b2 of the torsional coil spring 4, so that it is possible to separate the inner circumferential surface of the third region 4b3 of the torsional coil spring 4 from the contact surface 403c of the second rotatable body 403. That is, the supporting protrusion 403e is not an obstacle to increasing in the number of active turns of the torsional coil spring 4.

In a case where the supporting protrusion 403e is not provided, when the torsional coil spring 4 is twisted in the diameter increasing direction, the torsional stress is most greatly concentrated in the vicinity of the position distant from the front end surface 4a of the torsional coil spring 4 by 90° about the rotation axis. However, in this embodiment, since the supporting protrusion 403e is disposed to contain the position distant from the contact surface 403d by 90° about the rotation axis, it is possible to prevent torsional stress from being concentrated in the vicinity (the second region 4b2) of the position distant from the front end surface 4a of the torsional coil spring 4 by 90° about the rotation axis.

When the angle α1, which is formed by the contact surface 403d and the end portion of the supporting protrusion 403e farther from the contact surface 403d, increases excessively, a contact area between the front end region (other end region) 4b of the torsional coil spring 4 and the supporting protrusion 403e increases and the front end region (other end region) 4b of the torsional coil spring 4 becomes difficult to slide against the supporting protrusion 403e. For this reason, the torsional angle at the time when the front end region (other end region) 4b of the torsional coil spring 4 slides against the supporting protrusion 403e and the front end surface 4a of the torsional coil spring 4 is brought into contact with the contact surface 403d of the second rotatable body 403 increases, so that the torsional coil spring 4 is easily subjected to fatigue in a range of up to this torsional angle.

In this embodiment, since the angle $\alpha 1$ is set to 315° or less, it is possible to prevent the excessive increase in the torsional angle when the front end region 4b of the torsional coil spring 4 slides against the supporting protrusion 403e.

In this embodiment, since the second rotatable body 403 has the contact surface 403d that faces the front end surface 4a of the torsional coil spring 4, when the torsional coil spring 4 is twisted in the diameter increasing direction, the front end surface 4a of the torsional coil spring 4 is brought into contact with the contact surface 403d of the second rotatable body 403, so that it is possible to fix the torsional coil spring 4 to the second rotatable body 403.

In this embodiment, since the gap Q1 is present between the outer circumferential surface of the third region 4b3 of the torsional coil spring 4 and the inner circumferential surface of the outer cylinder portion 403b of the second rotatable body 403 in a state where the pulley structure 401 is in the stopped state, when the torsional coil spring 4 is twisted in the diameter increasing direction, the third region 4b3 of the torsional coil spring 4 can be deformed in the diameter increasing direction to separate from the contact surface 403c of the second rotatable body 403.

In this embodiment, since the gap M1 is present between the outer circumferential surface of the middle region of the torsional coil spring 4 and the annular surface 2b of the first rotatable body 2 in a state where the pulley structure 401 is in the stopped state, when the torsional coil spring 4 is twisted in the diameter increasing direction, the torsional coil spring 4 can be easily deformed in the diameter increasing direction.

Sixth Embodiment

Figure 15:
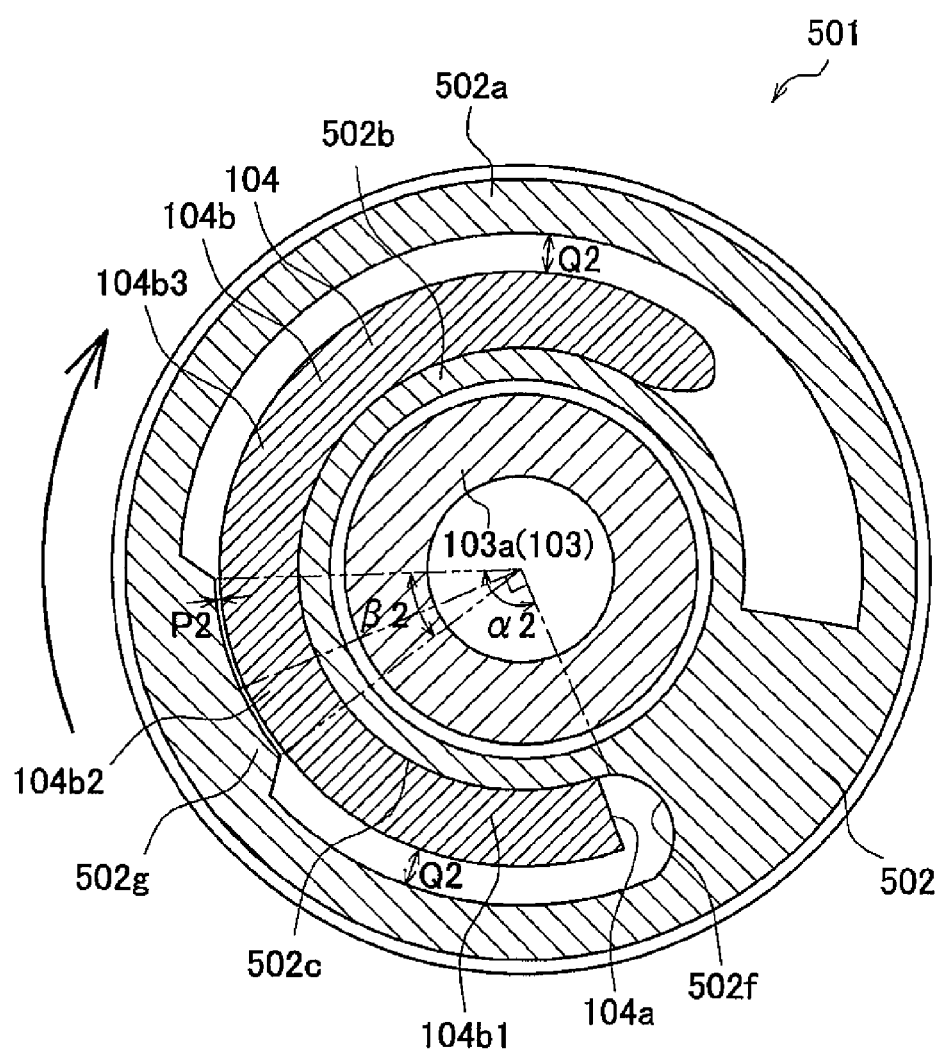
FIG. 15 is a cross-sectional view of a pulley structure of the sixth embodiment of the present invention.

Subsequently, a pulley structure 501 of a sixth embodiment of the present invention will be described. As illustrated in FIG. 15, in the pulley structure 501 of this embodiment, the configuration of a first rotatable body 502 is different from that of the first rotatable body 102 of the second embodiment, and other configurations are the same as the second embodiment. The same reference signs are assigned to components having the same configurations as the second embodiment, and descriptions thereof will be appropriately omitted.

The first rotatable body 502 has a cylinder main body 502a and an inner cylinder portion 502b having the same configuration as the inner cylinder portion 102b of the second embodiment. The first rotatable body 502 has a contact surface 502f having the same configuration as the contact surface 102f of the second embodiment in a connecting portion between the cylinder main body 502a and the inner cylinder portion 502b. In an inner circumferential surface of the cylinder main body 502a of this embodiment, the shape of a portion facing the rear end region (other end region) 104b of the torsional coil spring 104 is different from that of the cylinder main body 102a of the second embodiment, and other configurations are the same as the cylinder main body 102a of the second embodiment.

A supporting protrusion 502g that protrudes inwards in a radial direction is provided on a portion facing the rear end region (other end region) 104b of the torsional coil spring 104 in the inner circumferential surface of the cylinder main body 502a. The supporting protrusion 502g is disposed in a region that contains a position distant from the contact surface 502f by 90° about a rotation axis. In FIG. 15, the position distant from the contact surface 502f by 90° about the rotation axis is located in a substantially circumferential center portion of the supporting protrusion 502g, but the position may not be located in the circumferential center portion.

The supporting protrusion 502g is distant from the contact surface 502f in a circumferential direction. Angle $\alpha 2$ about a rotation axis, which is formed by the contact surface 502f and an end portion of the supporting protrusion 502g farther from the contact surface 502f, is preferably less than or equal to 315°. In FIG. 15, the angle $\alpha 2$ is an approximately 110°, and angle $\beta 2$ (an angle about the rotation axis, which is formed by the end portion of the supporting protrusion 502g farther from the contact surface 502f and an end portion thereof closer to the contact surface 502f) of the supporting protrusion 502g is an approximately 35°.

Similar to the second embodiment, in a state where the pulley structure 501 is in the stopped state, the inner circumferential surface of the rear end region (other end region) 104b of the torsional coil spring 104 is pushed against a contact surface 502c (an outer circumferential surface of the inner cylinder portion 502b) of the first rotatable body 502. In the rear end region (other end region) 104b of the torsional coil spring 104, the vicinity of the position distant from the rear end surface 104a by 90° about the rotation axis is referred to as a second region 104b2, a region closer to the rear end surface 104a than the second region 104b2 is referred to as a first region 104b1, and the remainder is referred to as a third region 104b3. The second region 104b2 faces the supporting protrusion 502g.

In a state where the pulley structure 501 is in the stopped state, a gap (third gap) P2 is formed between an outer circumferential surface of the second region 104b2 of the torsional coil spring 104 and the supporting protrusion 502g. Gaps (fourth gap) Q2's are formed between an outer circumferential surface of the first region 104b1 and the third region 104b3 of the torsional coil spring 104, and the inner circumferential surface of the cylinder main body 502a, respectively. The gap P2 is smaller than the gap Q2.

Subsequently, the operation of the pulley structure 501 will be described.

First, a case will be described in which the rotating speed of the first rotatable body 502 is higher than the rotating speed of the second rotatable body 103. In this case, the first rotatable body 502 rotates relative to the second rotatable body 103 in the same direction as the rotation direction (direction of the arrow in FIG. 15).

In association with the relative rotation of the first rotatable body 502, the rear end region (other end region) 104b of the torsional coil spring 104 together with the contact surface 502c of the first rotatable body 502 rotates relative to the second rotatable body 103. Accordingly, the torsional coil spring 104 is twisted in the diameter increasing direction.

Similar to the second embodiment, the press contact force of the front end region of the torsional coil spring 104 against the press contact surface 103c increases further as the torsional angle of the torsional coil spring 104 increases.

Since the maximum torsional stress is likely to be applied to the vicinity (the second region 104b2) of the position distant from the rear end surface 104a of the torsional coil spring 104 by 90° about the rotation axis, when the torsional angle increases, the second region 104b2 of the torsional coil spring 104 separates from the contact surface 502c. At this time, the first region 104b1 and the third region 104b3 are in press contact with the contact surface 502c. Almost at the same time when the second region 104b2 separates from the contact surface 502c or when the torsional angle increases further than that, the outer circumferential surface of the second region 104b2 is brought into contact with the supporting protrusion 502g.

Since contact between the outer circumferential surface of the second region 104b2 and the supporting protrusion 502g limits (prevents) a deformation of the rear end region (other end region) 104b of the torsional coil spring 104 in the diameter increasing direction, torsional stress is distributed to turns other than the rear end region (other end region) 104b. In particular, torsional stress applied to front turns of the torsional coil spring 104 increases. Accordingly, since a difference between torsional stress applied to each turn of the torsional coil spring 104 can be reduced and the entirety of the torsional coil spring 104 can absorb strain energy, a local fatigue failure can be prevented.

The press contact force of the third region 104b3 against the contact surface 502c decreases further as the torsional angle increases, and almost at the same time when the second region 104b2 is brought into contact with the supporting protrusion 502g or when the torsional angle increases further than that, the press contact force of the third region 104b3 against the contact surface 502c becomes almost zero. The torsional angle at this time is referred to as angle $\phi11$ (equivalent to $\phi1$ in the fifth embodiment).

When the torsional angle exceeds the angle $\phi11$, the inner circumferential surface of at least a circumferential portion of the third region 104b3 separates from the contact surface 502c due to a deformation of the third region 104b3 in the diameter increasing direction, the rear end region (other end region) 104b of the torsional coil spring 104 moves (slides against the supporting protrusion 502g and the contact surface 502c) in the circumferential direction while overcoming the press contact force of the second region 104b2 against the supporting protrusion 502g and the press contact force of the first region 104b1 against the contact surface 502c, and the rear end surface 104a of the torsional coil spring 104 is pressed against the contact surface 502f of the first rotatable body 502.

As such, when the torsional angle of the torsional coil spring 104 in the diameter increasing direction is greater than or equal to the angle $\phi11$ (less than angle $\phi12$), in the rear end region (other end region) 104b of the torsional coil spring 104, the third region 104b3 separates from the contact surface 502c (and is not in contact with the inner circumferential surface of the cylinder main body 502a) and the second region 104b2 is in press contact with the supporting protrusion 502g. Accordingly, the number of active turns of the torsional coil spring 104 increases compared to when the torsional angle is less than $\phi11$.

When the torsional angle becomes a predetermined angle $\phi12$ (equivalent to $\phi2$ in the fifth embodiment), the outer circumferential surface of the middle region of the torsional coil spring 104 is brought into contact with the inner circumferential surface of the cylinder main body 502a of the first rotatable body 502 or the torsional angle reaches a limit angle, so that a further deformation of the torsional coil spring 104 in the diameter increasing direction is limited and the first rotatable body 502 rotates integrally with the second rotatable body 103. Accordingly, damage of the torsional coil spring due to a deformation in the diameter increasing direction can be prevented. The size of each of the gaps P2 and M2 in the state where the pulley structure is in the stopped state is set, taking into consideration the characteristics of the torsional coil spring 104, such as spring constant, limit angle of the torsional angle, and the like.

The operation when the rotating speed of the first rotatable body 502 is lower than the rotating speed of the second rotatable body 103 is the same as the second embodiment.

Similar to the pulley structure 401 of the fifth embodiment, since the torsional coil spring 104 is twisted when the two rotatable bodies 502 and 103 rotate relative to each other, the pulley structure 501 of this embodiment can absorb a change of rotation. When the rotating speed of the first rotatable body 502 is higher than that of the second rotatable body 103, the spring constant can be decreased by increasing the number of active turns of the torsional coil spring 104. As a result, it is possible to improve the fatigue resistance of the torsional coil spring 104 without increasing the number of turns of the coil spring (without increasing the size of the pulley structure) compared to a conventional pulley structure in which an inner circumferential surface or an outer circumferential surface of each of opposite end portions of a coil spring is fixed to rotatable bodies even when rotating relative to each other. It is possible to prevent torsional stress from being concentrated on the rear end region (other end region) 104b (particularly, the second region 104b2) of the torsional coil spring 104 by providing the supporting protrusion 502g, so that a fatigue failure of the torsional coil spring 104 can be prevented. In addition, it is possible to obtain the same effects as the fifth embodiment.

Seventh Embodiment

Figure 16:
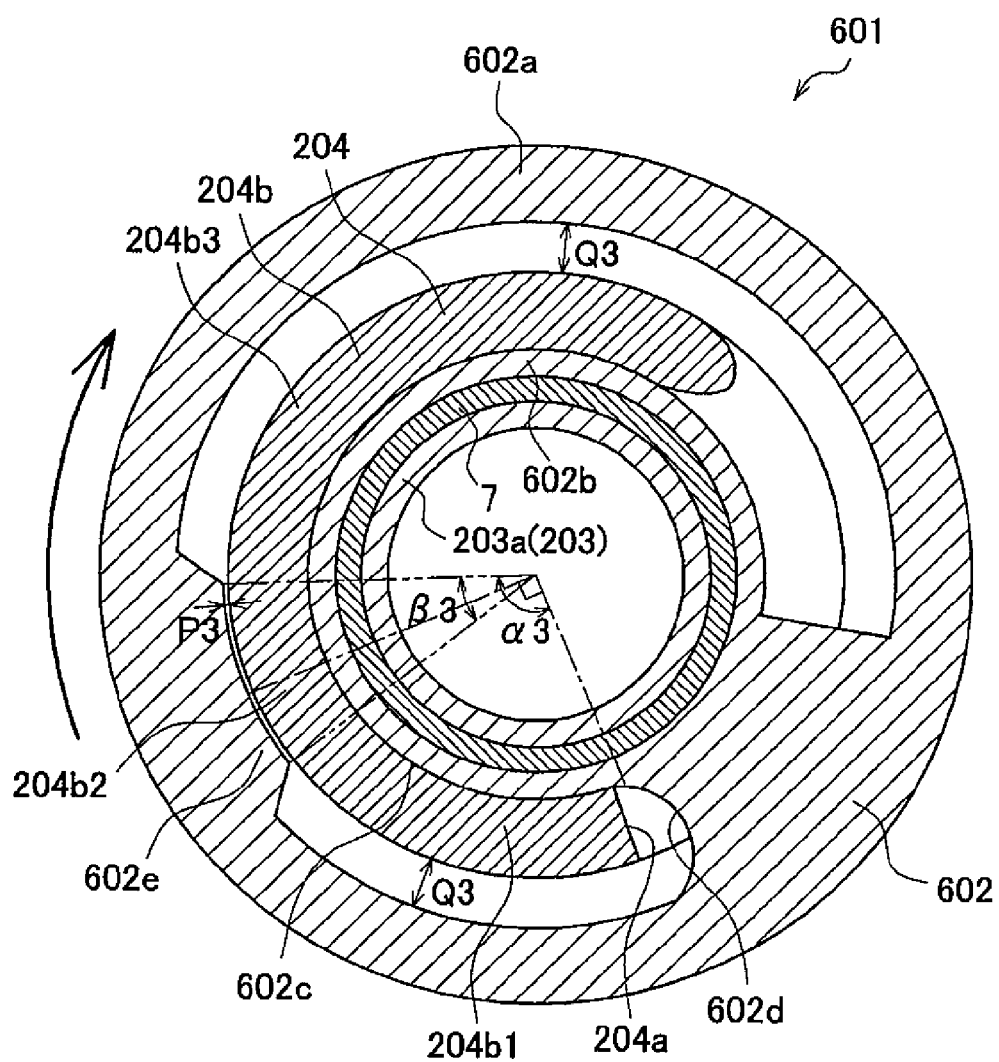
FIG. 16 is a cross-sectional view of a pulley structure of the seventh embodiment of the present invention.

Subsequently, a pulley structure 601 of a seven embodiment of the present invention will be described. As illustrated in FIG. 16, in the pulley structure 601 of this embodiment, the configuration of a cylinder main body 602a of a first rotatable body 602 is different from that of the cylinder main body 202a of the first rotatable body 202 of the third embodiment, and other configurations are the same as the third embodiment. The same reference signs are assigned to components having the same configurations as the third embodiment, and descriptions thereof will be appropriately omitted.

The first rotatable body 602 has the cylinder main body 602a and an inner cylinder portion 602b having the same configuration as the inner cylinder portion 202b of the third embodiment. The first rotatable body 602 has a contact surface 602d having the same configuration as the contact surface 202d of the third embodiment in a connecting portion between the cylinder main body 602a and the inner cylinder portion 602b. In an inner circumferential surface of the cylinder main body 602a of this embodiment, the shape of a portion facing the front end region (other end region) 204b of the torsional coil spring 204 is different from that of the cylinder main body 202a of the third embodiment, and other configurations are the same as the cylinder main body 202a of the third embodiment.

A supporting protrusion 602e that protrudes inwards in a radial direction is provided on a portion facing the front end region (other end region) 204b of the torsional coil spring 204 in the inner circumferential surface of the cylinder main body 602a. The supporting protrusion 602e is disposed in a region that contains a position distant from the contact surface 602d by 90° about a rotation axis. In FIG. 16, the position distant from the contact surface 602d by 90° about the rotation axis is located in a substantially circumferential center portion of the supporting protrusion 602; but the position may not be located in the circumferential center portion.

The supporting protrusion 602e is distant from the contact surface 602d in a circumferential direction. Angle α3 about a rotation axis, which is formed by the contact surface 602d and an end portion of the supporting protrusion 602e farther from the contact surface 602d, is preferably less than or equal to 315°. In FIG. 16, the angle α3 is an approximately 110', and angle β3 (an angle about the rotation axis, which is formed by the end portion of the supporting protrusion 602e farther from the contact surface 602d, and an end portion thereof closer to the contact surface 602d) of the supporting protrusion 602e is an approximately 35°.

Similar to the third embodiment, in a state where the pulley structure 601 is in the stopped state, the inner circumferential surface of the front end region (other end region) 204b of the torsional coil spring 204 is pushed against a contact surface 602c (an outer circumferential surface of the inner cylinder portion 602b) of the first rotatable body 602. In the front end region (other end region) 204b of the torsional coil spring 204, the vicinity of the position distant from the front end surface 204a by 90° about the rotation axis is referred to as a second region 204b2, a region closer to the front end surface 204a than the second region 204b2 is referred to as a first region 204b1, and the remainder is referred to as a third region 204b3. The second region 204b2 faces the supporting protrusion 602e.

In a state where the pulley structure 601 is in the stopped state, a gap (third gap) P3 is formed between an outer circumferential surface of the second region 204b2 of the torsional coil spring 204 and the supporting protrusion 602e. Gaps (fourth gap) Q3's are formed between an outer circumferential surface of the first region 204b1 and the third region 204b3 of the torsional coil spring 204, and the inner circumferential surface of the cylinder main body 602a. The gap P3 is smaller than the gap Q3.

Subsequently, the operation of the pulley structure 601 will be described.

First, a case will be described in which the rotating speed of the first rotatable body 602 is higher than the rotating speed of the second rotatable body 203. In this case, the first rotatable body 602 rotates relative to the second rotatable body 203 in the same direction as the rotation direction (direction of the arrow in FIG. 16).

In association with the relative rotation of the first rotatable body 602, the front end region (other end region) 204b of the torsional coil spring 204 together with the contact surface 602c of the first rotatable body 602 rotates relative to the second rotatable body 203. Accordingly, the torsional coil spring 204 is twisted in the diameter increasing direction.

Similar to the third embodiment, the press contact force of the rear end region of the torsional coil spring 204 against the press contact surface 203c increases further as the torsional angle of the torsional coil spring 204 increases.

Since the maximum torsional stress is likely to be applied to the vicinity (the second region 204b2) of the position distant from the front end surface 204a of the torsional coil spring 204 by 90° about the rotation axis, when the torsional angle increases, the second region 204b2 of the torsional coil spring 204 separates from the contact surface 602c. At this time, the first region 204b1 and the third region 204b3 are in press contact with the contact surface 602c. Almost at the same time when the second region 204b2 separates from the contact surface 602c or when the torsional angle increases further than that, the outer circumferential surface of the second region 204b2 is brought into contact with the supporting protrusion 602e.

Since contact between the second region 204b2 and the supporting protrusion 602e limits (prevents) a deformation of the front end region (other end region) 204b of the torsional coil spring 204 in the diameter increasing direction, torsional stress is distributed to turns other than the front end region (other end region) 204b. In particular, torsional stress applied to rear turns of the torsional coil spring 204 increases. Accordingly, since a difference between torsional stress applied to each turn of the torsional coil spring 204 can be reduced and the entirety of the torsional coil spring 204 can absorb strain energy, a local fatigue failure can be prevented.

The press contact force of the third region 204b3 against the contact surface 602c decreases further as the torsional angle increases, and almost at the same time when the second region 204b2 is brought into contact with the supporting protrusion 602e or when the torsional angle increases further than that, the press contact force of the third region 204b3 against the contact surface 602c becomes almost zero. The torsional angle at this time is referred to as angle φ21 (equivalent to φ1 in the fifth embodiment).

When the torsional angle exceeds the angle φ21, an inner circumferential surface of at least a circumferential portion of the third region 204b3 separates from the contact surface 602c due to a deformation of the third region 204b3 in the diameter increasing direction, the front end region (other end region) 204b of the torsional coil spring 204 moves (slides against the supporting protrusion 602e and the contact surface 602c) in the circumferential direction while overcoming the press contact force of the second region 204b2 against the supporting protrusion 602e and the press contact force of the first region 204b1 against the contact surface 602c, and the front end surface 204a of the torsional coil spring 204 is pressed against the contact surface 602d of the first rotatable body 602.

As such, when the torsional angle of the torsional coil spring 204 in the diameter increasing direction is greater than or equal to the angle φ21 (less than an angle φ22), in the front end region (other end region) 204b of the torsional coil spring 204, the third region 204b3 separates from the contact surface 602c (and is not in contact with the inner circumferential surface of the cylinder main body 602a) and the second region 204b2 is in press contact with the supporting protrusion 602e. Accordingly, the number of active turns of the torsional coil spring 204 increases compared to when the torsional angle is less than φ21.

When the torsional angle becomes a predetermined angle φ22 (equivalent to φ2 in the fifth embodiment), the outer circumferential surface of the middle region of the torsional coil spring 204 is brought into contact with the inner circumferential surface of the cylinder main body 602a of the first rotatable body 602 or the torsional angle reaches a limit angle, so that a further deformation of the torsional coil spring 204 in the diameter increasing direction is limited and the first rotatable body 602 rotates integrally with the second rotatable body 203. Accordingly, damage of the torsional coil spring due to a deformation in the diameter increasing direction can be prevented. The size of each of the gaps P3 and M3 in the state where the pulley structure is in the stopped state is set, taking into consideration the characteristics of the torsional coil spring 204, such as spring constant, limit angle of the torsional angle, and the like.

The operation when the rotating speed of the first rotatable body 602 is lower than the rotating speed of the second rotatable body 203 is the same as the third embodiment.

Similar to the pulley structure 401 of the fifth embodiment, since the torsional coil spring 204 is twisted when the two rotatable bodies 602 and 203 rotate relative to each other, the pulley structure 601 of this embodiment can absorb a change of rotation. When the rotating speed of the first rotatable body 602 is higher than that of the second rotatable body 203, the spring constant can be decreased by increasing the number of active turns of the torsional coil spring 204. As a result, it is possible to improve the fatigue resistance of the torsional coil spring 204 without increasing the number of turns of the coil spring (without increasing the size of the pulley structure) compared to a conventional pulley structure in which an inner circumferential surface or an outer circumferential surface of each of opposite end portions of a coil spring is fixed to rotatable bodies even when rotating relative to each other. It is possible to prevent torsional stress from being concentrated on the front end region (other end region) 204b (particularly, the second region 204b2) of the torsional coil spring 204 by providing the supporting protrusion 602e, so that a fatigue failure of the torsional coil spring 204 can be prevented. In addition, it is possible to obtain the same effects as the fifth embodiment.

Modification Example 1 of Fifth to Seventh Embodiments

In the fifth to seventh embodiments, one supporting protrusion is provided at a predetermined position. When the torsional coil spring is twisted in the diameter increasing direction, the outer circumferential surface of the second region of the torsional coil spring is brought into contact with the supporting protrusion, so that a deformation of the other end region of the torsional coil spring in the diameter increasing direction is limited and torsional stress is also distributed to the turns other than the other end region.

When the engine to be connected has a small torque output, the angle $\alpha$ (angle about the rotation axis, which is formed by the contact surface and the farther end portion of the region where the supporting protrusion is formed from the contact surface) may be an approximately 135° or less. However, since a large torque is input to a pulley depending on the type of engine, a deformation of the torsional coil spring in the diameter increasing direction cannot be sufficiently prevented by the supporting protrusion having such a limit range as the angle $\alpha$=110° and the angle $\beta$ (angle about the rotation axis, which is formed by the end portion of the supporting protrusion farther from the contact surface and the end portion thereof closer to the contact surface)=35°, as illustrated in the fifth to seventh embodiments. Accordingly, from various test results, it has become apparent that the angle $\alpha$ is preferably increased up to 315° or less so as to reliably limit the deformation of the torsional coil spring in the diameter increasing direction even when an excessive torque is input to the pulley depending on the type of engine.

Examples of a method of increasing the angle $\alpha$ of the supporting protrusion up to 315° or less include a method of extending the supporting protrusion about the rotation axis farther from the contact surface than in the fifth to seventh embodiments; and a method of providing a plurality of the supporting protrusions with a gap interposed therebetween.

When the supporting protrusion is extended about the rotation axis farther from the contact surface than in the fifth to seventh embodiments, the angle $\beta$ of the supporting protrusion increases excessively and the contact area between the other end region of the torsional coil spring and the supporting protrusion increases. As a result, sliding (frictional) resistance increases and the torsional angle of the torsional coil spring increases, so that the torque characteristics (torque curve) or durability thereof may be adversely affected. Accordingly, in this configuration, the range of the angle $\alpha$ is preferably an approximately 180° or less, and more preferably approximately 45° or greater and approximately 180° or less so as not to adversely affect the torque characteristics (torque curve) and durability. When the angle $\alpha$ is less than 45°, only a small contact area between the other end region of the torsional coil spring and the supporting protrusion is obtained, so that the effect of limiting a deformation of the torsional coil spring in the diameter increasing direction may be poor.

When the angle $\alpha$ of the supporting protrusion increases excessively to exceed 180°, it is preferable to adopt such a configuration that the supporting protrusion is divided into a plural portions (at least two) about the rotation axis so as to prevent an increase in sliding (frictional) resistance from adversely affecting the torque characteristics (torque curve) or durability. In this manner, it is possible to limit an increase in sliding (frictional) resistance to the minimum level, and to realize a pulley structure with good torque characteristics (torque curve) or good durability. As a specific example, two supporting protrusions may be provided in which one may be provided in a region that contains a position distant from the contact surface by 90° about the rotation axis and the other may be provided in a region that contains a position distant from the contact surface by 270° about the rotation axis. With regard to the size (the angle $\beta$) of the supporting protrusion, for example, it is $\beta$=90°, but is set to the appropriate extent that the magnitude of a torsional torque input to the pulley does not cause excessive sliding (frictional) resistance.

Modification Example 2 of Fifth to Seventh Embodiments

In the fifth to seventh embodiments, limiting means (the supporting protrusions 403e, 502g, 602e) is formed on one of two rotatable bodies, but the limiting means (at least one supporting protrusion, etc.) may be provided on the torsional coil spring. Specifically, it is possible to form at least one supporting protrusion that protrudes outwards in the radial direction on the outer circumference of the other end region of the torsional coil spring. For example, it can be realized by caulking, particularly, brazing a C-shaped metal fitting on the outer circumferential surface of the other end region of the torsional coil spring to protrude toward the outer circumference. In this case, similar to the case in which the supporting protrusion is provided on the rotatable body so as to protrude inwards in the radial direction, effects of limiting a deformation of the torsional coil spring in the diameter increasing direction can be obtained.

The preferred embodiments of the present invention have been described; however, the present invention is not limited to the first to seventh embodiments, and various modifications can be made thereto insofar as described in the scope of the claims.

In the first to seventh embodiments, the contact surface 3d, 102f, 202d, 303b, 403d, 502f, and 602d has a circular arc shape, but may not have a circular arc shape. For example, the contact surface may be formed along the radial direction. For example, the contact surface may have an inner circumferential portion formed into a straight shape that is inclined with respect to the radial direction or a circular arc shape, and have an outer circumferential portion formed along the radial direction.

In the first to seventh embodiments, it is configured that the end portion of the torsional coil spring is in press contact with the press contact surface or the contact surface extends halfway or more in a state where the pulley structure is in the stopped state (refer to FIGS. 1, 5, 8, 11, etc.), but the length of a press contact (contact) range may be less than or greater than that.

In the first to seventh embodiments, the wire material of the torsional coil spring has a square cross section (refer to FIGS. 1, 5, 8 and 11); however, it is not limited thereto, and may be a rectangular shape or a circular shape.

In the first to seventh embodiments, the number of turns of the torsional coil spring is four (refer to FIGS. 1, 5, 8, and 11), but may be greater than or less than that.

In the first to seventh embodiments, the diameter of the torsional coil spring without an external force applied thereto is constant over the entire length thereof, but may not be constant. That is, the spring may have an exterior appearance that maintains the following relationship: the outer diameter of the contact surface 3c, 102c, 202c, and 303a>the inner diameter of the torsional coil spring 4, 104, 204, and 304; and the inner diameter of the press contact surface 2a, 103c, 203c, and 302c<the outer diameter of the torsional coil spring 4, 104, 204, and 304.

In the fifth to seventh embodiments, the supporting protrusions 403e, 502g, and 602e are distant from the contact surfaces 403d, 502f, and 602d, respectively in the circumferential direction, but the supporting protrusion may extend to the contact surface. That is, the angle β1, β2, and β3 may be the same as the angle α1, α2, and α3, respectively.

In the fifth to seventh embodiment, the gaps P1, P2, and P3 are formed between the supporting protrusions 403e, 502g, and 602e, respectively and the outer circumferential surface of the torsional coil spring in a state where the pulley structure is in the stopped state; however, the supporting protrusion may be in contact with the outer circumferential surface of the torsional coil spring in the state where the pulley structure is in the stopped state. Also in this case, the same effects as the fifth to seventh embodiments can be obtained. In the modification examples, it is possible to more reliably prevent torsional stress from being concentrated on the second region of the torsional coil spring.

In the fifth to seventh embodiments, when the torsional coil spring is twisted in the diameter increasing direction, the respective outer circumferential surfaces of the first region and the third region of the torsional coil spring are not in contact with the rotatable body. However, it may be configured that the gap Q1, Q2, and Q3 is smaller than that in the embodiments and after the end surface of the torsional coil spring is brought into contact with the contact surface 403d, 502f, and 602d, the respective outer circumferential surfaces of the first region and the third region of the torsional coil spring is brought into contact with the rotatable body. In this case, the number of change in active turns is greater by one than that in the fifth to seventh embodiments.

In the first to seventh embodiments, the pulley structure of the present invention is applied to a pulley that is installed on the drive shaft of an alternator, but the present invention may be applied to a pulley that is installed on the drive shaft of another auxiliary unit in addition to the alternator.

This application is based on Japanese Patent Application No. 2012-138978 filed on Jun. 20, 2012, Japanese Patent Application No. 2012-252550 filed on Nov. 16, 2012, and Japanese Patent Application No. 2013-125839 filed on Jun. 14, 2013, the content of each of which is incorporated herein by reference.

DESCRIPTION OF REFERENCE NUMERALS AND SIGNS

1, 101, 201, 301, 401, 501, 601: Pulley structure
2, 102, 202, 302, 402, 502, 602: First rotatable body
2a, 302c: Press contact surface (first rotatable body)
2b, 102d, 102e: Annular surface
3, 103, 203, 303, 403: Second rotatable body
3a, 103a, 203a, 403a: Cylinder main body (second rotatable body)
3b, 103b, 203b, 403b: Outer cylinder portion (second rotatable body)
3c, 303a, 403c: Contact surface (second rotatable body)
3d, 303b, 403d: Contact surface (second rotatable body)
4, 104, 204, 304: Torsional coil spring
4a, 204a: Front end surface
4b, 204b: Front end region (other end region)
4b1, 204b1: First region
4b2, 204b2: Second region
4b3, 204b3: Third region
5: End cap
6, 206: Roller bearing
7, 207: Slide bearing
8, 108, 208, 308: Spring accommodating space
102a, 202a, 302a, 502a, 602a: Cylinder main body (first rotatable body)
102b, 202b, 302b, 502b, 602b: Inner cylinder portion (first rotatable body)
102c, 202c, 502c, 602c: Contact surface (first rotatable body)
102f, 202d, 502f, 602d: Contact surface (first rotatable body)
103c, 203c: Press contact surface (second rotatable body)
104a, 304a: Rear end surface
104b, 304b: Rear end region (other end region)
104b1: First region
104b2: Second region
104b3: Third region
403e, 502g, 602e: Supporting protrusion
B: Belt
L1, L2, L3, L4: Gap (first gap)
M1, M2, M3, M4: Gap (second gap)
P1, P2, P3: Gap (third gap)
Q1, Q2, Q3: Gap (fourth gap)

The invention claimed is:

1. A pulley structure comprising:
a first rotatable body having a cylindrical shape, over which a belt is stretched;
a second rotatable body that is provided inward of the first rotatable body so as to be rotatable relative to the first rotatable body; and
a torsional coil spring that is accommodated in a space between the first rotatable body and the second rotatable body,
wherein the torsional coil spring has one end region at one end side thereof, the outer circumferential surface of which is in contact with one rotatable body of the first rotatable body and the second rotatable body due to the self elastic restoring force of the torsional coil spring in a diameter increasing direction when the pulley structure is in a stopped state; the other end region at the other end side thereof, the inner circumferential surface of which is in contact with the other rotatable body when the pulley structure is in the stopped state; and a middle region, and wherein when the torsional coil spring is twisted in the diameter increasing direction due to a relative rotation between the two rotatable bodies, the inner circumferential surface of at least a circumferential portion of the other end region of the torsional coil spring separates from the other rotatable body.

2. The pulley structure according to claim 1, wherein the other rotatable body has a contact surface that faces an end surface of the other end side of the torsional coil spring in a circumferential direction, and wherein when the torsional coil spring is twisted in the diameter increasing direction due to a relative rotation between the two rotatable bodies, the end surface of the other end side of the torsional coil spring is brought into contact with the contact surface.

3. The pulley structure according to claim 2, further comprising:

a first gap that is formed between the outer circumferential surface of the other end region of the torsional coil spring and the first rotatable body or the second rotatable body, when the pulley structure is in the stopped state, wherein when the torsional coil spring is twisted in the diameter increasing direction due to a relative rotation between the two rotatable bodies, the outer circumferential surface of the other end region of the torsional coil spring is not in contact with any one of the two rotatable bodies when the end surface of the other end side of the torsional coil spring is in contact with the contact surface.

4. The pulley structure according to claim 3, further comprising:

a second gap that is formed between an outer circumferential surface of the middle region of the torsional coil spring and the first rotatable body or the second rotatable body, when the pulley structure is in the stopped state.

5. The pulley structure according to claim 4, wherein the size of the first gap is less than or equal to the size of the second gap.

6. The pulley structure according to claim 2, further comprising a limiting means for limiting a deformation of the other end region of the torsional coil spring in the diameter increasing direction before the end surface of the other end side of the torsional coil spring is in contact with the contact surface when the torsional coil spring is twisted in the diameter increasing direction due to a relative rotation between the two rotatable bodies.

7. The pulley structure according to claim 6, wherein the other rotatable body has the limiting means.

8. The pulley structure according to claim 7, wherein the limiting means is at least one supporting protrusion that protrudes inwards in a radial direction and that faces an outer circumferential surface of a circumferential portion of the other end region of the torsional coil spring, and wherein when the torsional coil spring is twisted in the diameter increasing direction due to a relative rotation between the two rotatable bodies, at least the one supporting protrusion is in contact with the outer circumferential surface of the other end region of the torsional coil spring and a deformation of the other end region of the torsional coil spring in the diameter increasing direction is limited.

9. The pulley structure according to claim 8, wherein a region in which the supporting protrusion is formed contains a position distant from the contact surface by 90° about a rotation axis.

10. The pulley structure according to claim 9, wherein an angle about the rotation axis formed by the contact surface and a farther end portion of the region in which the supporting protrusion is formed from the contact surface is less than or equal to 315°.

11. The pulley structure according to claim 8, further comprising a fourth gap that is formed between the outer circumferential surface of the other end region of the torsional coil spring and a portion other than the supporting protrusion of the other rotatable body when the pulley structure is in the stopped state, wherein the outer circumferential surface of the other end region of the torsional coil spring is in contact with the supporting protrusion, or the pulley structure further comprises a third gap that is formed between the outer circumferential surface of the other end region of the torsional coil spring and the supporting protrusion and is smaller than the fourth gap.

12. The pulley structure according to claim 6, wherein the torsional coil spring has the limiting means.

13. The pulley structure according to claim 12, wherein the limiting means is at least one supporting protrusion that protrudes outwards in the radial direction and that is present on the outer circumferential surface of a circumferential portion of the other end region of the torsional coil spring, and wherein when the torsional coil spring is twisted in the diameter increasing direction due to a relative rotation between the two rotatable bodies, at least the one supporting protrusion is in contact with an inner circumferential surface of the other rotatable body and a deformation of the other end region of the torsional coil spring in the diameter increasing direction is limited.

14. The pulley structure according to claim 6, further comprising a second gap that is formed between the outer circumferential surface of the middle region of the torsional coil spring and the first rotatable body or the second rotatable body when the pulley structure is in the stopped state.

* * * * *